US011615144B2

(12) United States Patent
Hammontree et al.

(10) Patent No.: US 11,615,144 B2
(45) Date of Patent: Mar. 28, 2023

(54) MACHINE LEARNING QUERY SESSION ENHANCEMENT

(71) Applicant: Microsoft Technology Licensing, LLC, Redmond, WA (US)

(72) Inventors: Monty Hammontree, Duvall, WA (US); Travis Lowdermilk, Kenmore, WA (US); Valentina Strachan, Redmond, WA (US); Maxim Lobanov, Bellevue, WA (US); Kelley Zhao, Redmond, WA (US); Steven Clarke, Edinburgh (GB); Jessica Rich, Redmond, WA (US); Juan P Carrascal-Ruiz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1132 days.

(21) Appl. No.: 15/994,907

(22) Filed: May 31, 2018

(65) Prior Publication Data
US 2019/0370412 A1    Dec. 5, 2019

(51) Int. Cl.
*G06F 16/9032* (2019.01)
*G06N 20/00* (2019.01)
*G06K 9/62* (2022.01)
*G06F 40/211* (2020.01)

(52) U.S. Cl.
CPC ...... *G06F 16/90332* (2019.01); *G06F 40/211* (2020.01); *G06K 9/6267* (2013.01); *G06N 20/00* (2019.01)

(58) Field of Classification Search
CPC . G06F 16/90332; G06F 40/211; G06N 20/00; G06K 9/6267
See application file for complete search history.

(56) References Cited

U.S. PATENT DOCUMENTS

| 2014/0108389 | A1* | 4/2014 | Lee | G06F 16/3347 707/723 |
| 2014/0149303 | A1* | 5/2014 | Band | G06Q 10/1057 705/322 |
| 2016/0203500 | A1* | 7/2016 | Williams | G06Q 30/0203 705/7.32 |
| 2016/0247068 | A1* | 8/2016 | Lin | G06N 5/02 |
| 2018/0150553 | A1* | 5/2018 | Endo | G06F 16/735 |

(Continued)

OTHER PUBLICATIONS

Herzig et al., "Emotion Detection from Text via Ensemble Classification Using Word Embeddings", ICTIR'17, Oct. 1-4, 2017, pp. 269-272 (Year: 2017).*

(Continued)

*Primary Examiner* — Andrew L Tank
(74) *Attorney, Agent, or Firm* — Schwegman Lundberg & Woessner, P.A.

(57) ABSTRACT

A computer method, system, and device of training an empathy model for detecting a type of query, the method including defining an intent for detecting closed ended queries, providing a plurality of queries that are closed ended queries to a machine learning model generator, said plurality of queries comprising training data, providing a plurality of corresponding labels identifying the plurality of queries as closed ended queries, and generating a model that classifies closed ended queries as a function of the training data.

20 Claims, 18 Drawing Sheets

(56) References Cited

U.S. PATENT DOCUMENTS

2020/0050636 A1* 2/2020 Datla ................. G06F 16/2379

OTHER PUBLICATIONS

Yadollahi et al., "Current State of Text Sentiment Analysis from Opinion to Emotion Mining", ACM Comput. Surv. 50, 2, Article 25, May 2017, pp. 1-33 (Year: 2017).*
Ryer, "Introducing Classificationbox: Easily build your own text/image/data machine learning classifier inside a Docker container", from: https://blog.machinebox.io/introducing-classificationbox-easily-build-your-own-text-image-data-machine-learning-classifier-9f8912e50a97, Feb. 20, 2018, pp. 1-6 (Year: 2018).*
Ryer, "Mute uninteresting log noise with Machine Learning", from: https://blog.machinebox.io/mute-uninteresting-log-noise-with-machine-learning-daa19f6e222, Mar. 16, 2018, pp. 1-8 (Year: 2018).*
Edell, Aaron, "How to Use AI to Detect Open-Ended Questions for Non-Datascientists", Retrieved From: https://towardsdatascience.com/how-to-use-ai-to-detect-open-ended-questions-for-non-datascientists-e2ef02427422, May 18, 2018, 7 Pages.
Hayashida, et al., "Category Classification of Text Data with Machine Learning Technique for Visualizing Flow of Conversation in Counseling", In Publication of 2017 Nicograph International (NicoInt), Jun. 2, 2017, pp. 37-40.
"International Search Report and Written Opinion Issued in PCT Application No. PCT/US19/032336", dated Jul. 30, 2019, 11 Pages.
Spijkerboer, Christian, "Towards Automatic Analyses of Police Interviews—Machine Learning of Question Type", In Proceedings of 25th Twente Student Conference on IT, Jul. 1, 2016, 10 Pages.

* cited by examiner

| | DASHBOARD BUILD PUBLISH SETTINGS | 🔍 | ⊙TRAIN ⬇TEST |

[HTTPS://INTERVIEWBOT.WEBSITE.NET] — 602

LOADING QUESTIONS (V.01) ⌄

∨ APP ASSETS

INTENTS

ENTITIES

∨ IMPROVE APP PERFORMANCE

REVIEW ENDPOINT UTTERANCES

PHRASE LISTS

PATTERNS

[DID] THIS MAKE YOU FEEL [ANGRY]?     [LEADINGQUESTION ⌄] ⋯

[HOW][ANGRY] WERE YOU?     [LEADINGQUESTION ⌄] ⋯

[WERE] YOU [HAPPY]?     [LEADINGQUESTION ⌄] ⋯

[WOULD] YOU BE [HAPPIER] WITH THE NEW VERSION?     [LEADINGQUESTION ⌄] ⋯

[ARE] YOU [HAPPY] OFTEN     [LEADINGQUESTION ⌄] ⋯

[HOW][GOOD][DO YOU] THINK THIS APP IS?     [LEADINGQUESTION ⌄] ⋯

[WHAT] ABOUT THIS PRODUCT DRIVES YOU [CRAZY]?     [LEADINGQUESTION ⌄] ⋯

[WHAT][UPSETS] YOU ABOUT THIS FEATURE?     [LEADINGQUESTION ⌄] ⋯

[WHAT][ANGERS] YOU ABOUT THIS FEATURE?     [LEADINGQUESTION ⌄] ⋯

[DO] YOU FIND THIS FEATURE [FRUSTRATING] TO USE?

☐ 1   2   [NEXT >]

PREVIEW

PREBUILT DOMAINS

_FIG. 9_

PHRASE LISTS ?

[ CREATE NEW PHRASE LIST ] ~1030

[ SEARCH PHRASE LISTS 🔍 ] ~1000

| NAME | VALUE | MODE | STATUS | |
|---|---|---|---|---|
| 1015~EMOTIONS | ANGRY,SAD,HAPPY,UNHAPPY,SCARED,ANNOYED,FR... | INTERCHANGEABLE | ENABLED | ... |
| 1020~JTBD_ACTIONS | EDIT,COMPILE,DEBUG,DEVELOPMENT,CODE,TESTI... | INTERCHANGEABLE | ENABLED | ... |
| 1025~JTBD_DIRECT_OBJECTS | APPS,APPLICATIONS,CONTAINERS,WEBSITE,SER... | INTERCHANGEABLE | ENABLED | ... |
| PROBLEM_INDICATOR | NOT EASY,HARD TO FINE,NOT SUCCESSFUL,NOT C... | INTERCHANGEABLE | ENABLED | ... |

*FIG. 10*

EDIT PHRASE LIST

NAME (REQUIRED) /1105

EMOTIONS|

VALUE (REQUIRED) /1110

TYPE COMMA SEPARATED VALUES AND PRESS ENTER...

PHRASE LIST VALUES /1115

| ANGRY ✕ | SAD ✕ | HAPPY ✕ | UNHAPPY ✕ | SCARED ✕ | ANNOYED ✕ |
| FRUSTRATED ✕ | CONTENT ✕ | DEPRESSED ✕ | BAD ✕ | CONFUSED ✕ |
| ENRAGED ✕ | ANXIOUS ✕ | DISAPPOINTED ✕ | WORRIED ✕ | UPSET ✕ |
| EMBARRASED ✕ | NERVOUS ✕ | BORED ✕ | SHOCKED ✕ | EXCITED ✕ |
| DISSATISFIED ✕ | TIRED ✕ | SURPRISED ✕ | OVERWHELMED ✕ | PLEASED ✕ |
| IRRITATED ✕ | THRILLED ✕ | AFRAID ✕ | FRIGHTENED ✕ | DISGUSTED ✕ |

RELATED VALUES /1120    ADD ALL ↻ RECOMMEND /1125

| VULNERABLE ✕ | SELFISH ✕ | PARANOID ✕ | RESENTFUL ✕ |
| SELF-CENTERED ✕ | ARROGANT ✕ | SELF-ABSORBED ✕ |
| CLUELESS ✕ | JEALOUS ✕ | IMPATIENT ✕ |

☑ THESE VALUES ARE INTERCHANGEABLE

[ SAVE ]  [ CANCEL ]
/1130

*FIG. 11*

| NAME ⌃ | LABELED UTTERANCE: |
|---|---|
| COMMUNICATION.CONFIRM | 8 |
| JTBD_HOW | 5 |
| JTBD_HOWMUCH | 6 |
| JTBD_WHEN | 3 |
| JTBD_WHERE | 1 |
| JTBD_WHO/WHAT | 5 |
| JTBD_WHY | 5 |
| LEADINGQUESTIONS | 16 |
| NONE | 14 |
| PROBLEM_HOW | 7 |
| PROBLEM_HOWMUCH | 9 |
| PROBLEM_WHEN | 4 |
| PROBLEM_WHERE | 5 |
| PROBLEM_WHO/WHAT | 8 |
| PROBLEM_WHY | 4 |
| YESNOQUESTIONS | 16 |

*FIG. 12*

| NORMALIZED VALUE | SYNONYMS | | | | |
|---|---|---|---|---|---|
| HOW | HOW DO YOU × | WHAT HAPPENS AFTER × | WHAT HAPPENS BEFORE × | WHAT OCCURS AFTER × | |
| | WHAT OCCURS BEFORE × | WHAT TYPICALLY HAPPENS BEFORE × | WHAT TYPICALLY HAPPENS AFTER × | | |
| | WHAT PRODUCTS × | WHAT SERVICES × | WHAT TECHNOLOGIES × | WHAT PLATFORMS × | |
| | WHAT LANGUAGES × | WHAT TOOLS × | WHAT CAUSES × | WHAT TRIGGERS × | WHAT LEADS TO × |
| | WHAT WORKAROUNDS × | | | | |
| HOW MUCH | HOW MANY × | HOW OFTEN × | HOW PROBLEMATIC × | BIGGEST × | MOST × | HOW WELL × |
| | HOW SATISFIED × | HOW PAINFUL × | HOW POORLY × | HOW FREQUENTLY × | |
| WHAT | WHATS × | WHAT IS × | | | |
| WHEN | WHEN DURING × | A TIME × | LAST TIME × | WORST TIME × | PAINFUL TIME × |
| WHERE | WHERE WERE YOU × | LOCATED × | | | |
| WHO | WHO'S × | WHO IS × | WHO DO × | WHO DOES × | WHO ELSE × | WHO IS INVOLVED × | DO YOU × |
| | ARE YOU × | | | | |
| WHY | WHAT MAKES YOU × | WHAT LEADS YOU × | WHAT MOTIVATES YOU × | WHAT DO YOU GAIN × | |
| | WHAT DO YOU LOSE × | WHAT WILL YOU LOSE × | WHAT WILL YOU GAIN × | WHAT MOTIVATED YOU × | |

APP ASSETS

- INTENTS
- ENTITIES
- IMPROVE APP PERFORMANCE
- REVIEW ENDPOINT UTTERANCES
- PHRASE LISTS
- PATTERNS

PREVIEW

PREBUILT DOMAINS

ENTITY FILTERS ∨ ○ SHOW ALL ○ ENTITIES VIEW 🔍

1600

1605

1610

☐ UTTERANCE | LABELED INTENT?

| Utterance | Labeled Intent |
|---|---|
| WHO IS INVOLVED IN [DEBUGGING] YOUR [MOBILE APP]? | JTBD_WHO/WHAT... |
| [ARE] YOU INVOLVED IN [DEBUGGING] YOUR [APP]? | |
| DO YOU [TEST] YOUR [APP]? | |
| WHO ELSE HAS DIFFICULTY [DEBUGGING] THE [APP]? | |
| HOW OFTEN DO YOU HAVE [TROUBLE] REMOTELY [DEBUGGING] YOUR [SERVICE]? | |
| DO YOU REMOTELY [DEBUG] YOUR [WEB SERVICE]? | |
| WHERE WERE YOU WHEN YOU RECEIVED A [FATAL ERROR] WHILE [DEBUGGING]? | |
| WHERE ARE YOU WHEN YOU RUN INTO [PROBLEMS TESTING] YOUR [APP]? | JTBD_WHO/WHAT... |
| WHERE WERE YOU WHEN YOU [CONNECTED] TO THE [SERVER]? | |
| HOW WOULD YOU DEAL WITH A [BUILD] [FAILURE]? | JTBD_WHO/WHAT... |

Intent popup:
- JTBD_WHO/WHAT 0.86
- PROBLEM_WHO/WHAT 0.11
- JTBD_HOW/MUCH 0.11
- PROBLEM_HOW/MUCH...
- PROBLEM_WHERE 0.07
- JTBD_HOW 0.03
- JTBD_WHEN 0.03
- PROBLEM_HOW 0.03
- NONE 0.03
- JTBD_WHY 0.01

☐ 1 2 3 [NEXT >]

MACHINE LEARNING QUERY SESSION ENHANCEMENT

BACKGROUND

Querying to obtain information can be quite challenging. Many queries generated may be closed ended, eliciting a short answer, when further information regarding the subject or subjects of the queries may be desired. Such inadequate queries can lead to extended query sessions and less information collected than desired.

SUMMARY

A computer method, system, and device of training an empathy model for detecting a type of query, the method including defining an intent for detecting closed ended queries, providing a plurality of queries that are closed ended queries to a machine learning model generator, said plurality of queries comprising training data, providing a plurality of corresponding labels identifying the plurality of queries as closed ended queries, and generating a model that classifies closed ended queries as a function of the training data.

BRIEF DESCRIPTION OF THE DRAWINGS

FIG. 4B is a further example representation of a conversation conducted using the system according to an example embodiment.

FIG. 9 is a screen shot of an example interface illustrating sample utterances for determining a leading question intent with example tokens according to an example embodiment.

FIG. 10 is a list of example phrases to leverage understanding of grammar according to an example embodiment.

FIG. 11 is a screen shot example interface for editing phrase lists according to an example embodiment.

FIG. 12 is a list of intents on which the vivid conversation model has been trained according to an example embodiment.

FIG. 13 is a list of normalized values and synonyms making up a vivid grammar list according to an example embodiment.

FIG. 15 is a screen shot illustrating an example (jobs to be done) JTBD_Action entity according to an example embodiment.

FIG. 16 is a screen shot illustrating the JTBD_Action entity with example tokens filled in for the entities according to an example embodiment.

DETAILED DESCRIPTION

Figure 1:
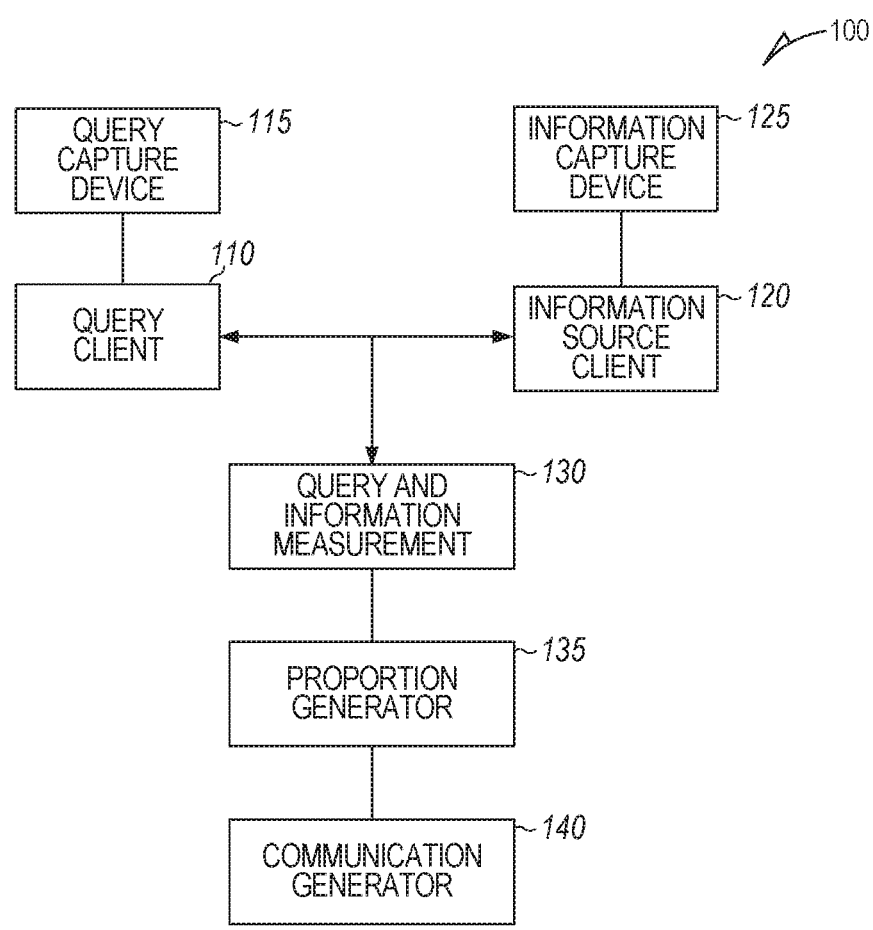
FIG. 1 is a block flow diagram of a system for querying an information source according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system." and the like may refer to computer-related entities, hardware, and software in execution, firmware, or combination thereof. A component may be a process running on a processor, an object, an executable, a program, a function, a subroutine, a computer, or a combination of software and hardware. The term. "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Querying to obtain information can be quite challenging. Many queries generated may be closed ended, eliciting a short answer, when further information regarding the subject or subjects of the queries may be desired. Such inadequate queries can lead to extended query sessions and less information collected than desired.

When querying people, queries may lack empathy, further eliciting short responses. Empathy may be thought of as the capacity to understand or feel what another person is experiencing from within their frame of reference, i.e., the capacity to place oneself in another's position. There are many definitions for empathy that encompass a broad range of emotional states. Types of empathy include cognitive empathy, emotional empathy, and somatic empathy.

It is easy for a person generating the queries to ask closed ended questions as opposed to open ended questions. Open ended questions generally elicit longer answers that include more information than a mere yes or no answer. With open ended questions, the person usually shares more information and feels like they have been given an opportunity to be heard. Thus, the goal of a user querying a person is to ensure that the queries exhibit empathy to make the person feel more willing to share more information.

While a well-trained interviewer may be good at generating queries that exhibit some form of empathy, the vast majority of people tasked with conducting interviews lack sufficient skills to generate queries that elicit complete responses that provide representative data or information suitable for making decisions. Representative data is information that is accurate and representative of a purpose of the querying. Without representative data, the data collected may misdirect decisions related to the purpose of the querying.

Queries generated during conversations may have some form of implicit bias, which can further hamper collection of full information from a person. Other problems with queries may include violation of privacy policies or a proportion of the number of queries to information provide in response to queries may be non-optimal for the information to be collected.

Research informs that "representative" data, is not enough to move people to action. One must appeal to the head and heart. Such appeals may be based on the context and circumstances of the conversation and may include story telling. These appeals prove to be inspirational in that they are more like to generate action. To effectively power a customer-driven culture/process one must complement "representative" data with data that is "relatable". Vivid interviews are a unique instrument to help foster the collection and dissemination of both representative data and relatable data. A vivid interview approach combines an interview grammar along with a domain specific grammar.

There are patterns that attribute to an empathy gap in conversations. Some common themes during conversations include the challenge of taking notes, identifying opportunities to probe deeper, the use of leading, biased, and closed ended questions, and difficulty in sharing empathy.

Having an engaging conversation with a customer and documenting everything that was said is incredibly difficult. Even when they partner up with a note taker, key insights are missed. Some have taken to recording their conversations, however, many rarely go back and transcribe their conversations. A review of notes of many conversations collected over time demonstrate missed opportunities for interviewers to probe for deeper insights.

While coaching, training, and mentoring people to have great conversations with customers and maximize the value of the data they're collecting, there are still times when they unknowingly fall back on "bad habits" that may exhibit bias, leading questions, and closed ended questions.

A common challenge for many leaders is that they feel like they have meaningful insights, but struggle to raise "above the noise" and get the attention of others. Many sharing channels like email and letters feel "*uninspired" or like "data dumps" that don't compel anyone to action.

While giving teams of interviewers or users education before going into customer interviews is useful, more tools are needed given the challenges described above. Having vivid stories, that move an organization to inspired action, having vivid conversations to begin with can be a powerful tool.

The use of vivid interviews ensures that users capture crucial elements of a vivid customer story. An example of capturing a vivid interview in the context of a development team interviewing customers to help in developing products, such as software and/or hardware products, may be based on an interview grammar combined with a domain-specific grammar. Products may also include services. The interview grammar is comprised of six categorical element or questions:

Who/What?: Attributes that capture the customer's context

How many?: Details that uncover quantity or scale

Where?: Where was, or will the customer be, when the events occur.

When?: When in time did events occur.

How?: Insights about complex interactions and workflows.

Why?: Summaries that help bring the entire story together

In various embodiments of the present inventive subject matter, the vivid grammar may be used to identify queries that may lack an empathy component. The vivid grammar may include components of queries that are based on who/what, how many, where, when, how, and why aspects that may be used to elicit a rich vivid conversation in many different scenarios, such as in the context of a development team interviewing customers. The vivid grammar is designed to elicit better content from people being queried.

Examples of queries being modified based on the vivid grammar may include changing a query from "Do you debug your apps" with "how do you debug your apps", "how often do you debug your apps", "when was the last time you debugged your apps", tell me about the worst time you had debugging your apps." These questions are more open ended and tend to elicit more information that closed ended questions. In addition, they encourage the person to share stories, which inherently have emotional components, giving the person a better feeling that the person presenting the queries is empathizing.

An example of a domain-specific grammar corresponding to the product development domain can be used by introducing our domain grammar for product development:

Customer: Details about the customer's context, motivation and tasks they perform.

Problem: Insights into the problems or frustrations the customer is experiencing.

Concept: Statements of whether a conceptual idea solves a problem and is valuable to the customer.

Feature: Indicators that a problem is being solved by a proposed feature and whether the customer finds the solution satisfactory.

Business: Details that indicate how the concept or feature can be best positioned to achieve business goals.

In one embodiment, the domain specific grammar may be combined with the vivid grammar to tailor the vivid grammar to a particular domain, such as in the context of the development team. Each domain may have a specific grammar that may or may not share elements of the product development domain grammar. For instance, development of products has a grammar corresponding to how product development evolves. Other domain specific grammars may be used to combine with the vivid grammar for other scenarios, such as healthcare, customer support, and others. The combination of these grammars creates a vivid interview that elicits a rich and vivid query session, such as a conversation between a development team member and a customer.

In one embodiment, the development team domain specific grammar may be selected to mirror various stages of product development, identifying customers, their problems, concepts thought of by developers to address the problems, turning the concept into a feature, and then making a business decision regarding the feature. A healthcare domain specific grammar for example may include patients, symptoms, diagnosis, treatment, and effect of the treatment. Other domain specific grammars may be easily developed for other scenarios by deriving stages and fundamental questions based on existing processes or new processes.

Bias entering a dialog between and interviewer and an interviewee, from either side of the conversation, can misdirect the conversation and if unchecked the understanding derived from that conversation. When potential bias is detected the interviewer can reduce the influence of the bias on the conversation and in turn the derived understanding by applying a vivid grammar to the ensuing conversation.

An example of speech-based intent detection services and vivid grammar application in the context of reducing interviewer bias may be based on:

Curse of knowledge: When better-informed people find it extremely difficult to think about problems from the perspective of lesser-informed people.

Examples of queries that reduce bias may include: detecting the use of an acronym (e.g., (CI/CD) and prompting the interviewer to fully articulate the phrase behind the acronym (e.g., continuous integration and deployment); detecting the use of a proper noun or subject that has not previously been introduced and prompting the interviewer to ensure the interviewee has working understanding of said subject.

Empathy gap: The tendency to underestimate the influence or strength of feelings in yourself or in others Examples of queries that reduce bias may include detecting when interviewee articulates a problem or expresses an emotion and prompt "how much of a problem" and/or "how strong of an emotional reaction"

Focusing effect: The tendency to place too much importance on one aspect of an event.

Examples of queries that reduce bias may include, for each unique topic of conversation, prompting for a more vivid recounting of an event such as the broader flow/"how", "who else" was involved, "when" was the last/worst/typical occurrence.

Wishful thinking: predicting that positive outcomes are more likely than negative outcomes, a pattern common in story sharing.

Examples of queries that reduce bias may include periodically prompting the interviewer to remind the interviewee that the purpose of the interview is to learn not confirm and by emphasizing the value of constructive feedback. In the context of product development this is particularly important for concept, feature, and business model topics of conversation.

Expectation bias: The tendency to believe data that agree with expectations and to disbelieve, discard, or downgrade data that appear to conflict with expectations.

Examples of queries that reduce bias may include leveraging cognitive services such as sentiment analysis to highlight direction and strength of interviewee affect. An example of speech-based intent detection services and vivid grammar application in the context of reducing interviewee bias may be based on:

Confirmation bias: The tendency to search for, interpret, focus on and remember information in a way that confirms preconceptions Examples of queries that reduce bias following potentially biased interviewee responses may include detecting when a stated behavior or emotional reaction has not been associated with a specific point in time and subsequently applying vivid grammar prompts such as "when did this last occur" and "how did it take place" to focus the conversation on recalled events rather than potentially biased generalizations.

Peak-end rule: An experience is perceived not as the sum of its parts but as some combination of how it was at its peak (e.g. pleasant or unpleasant) and how it ended.

Examples of queries that reduce bias following potentially biased interviewee responses may include detecting when a conclusion or reaction may be based on a single point in time versus a reoccurring pattern and subsequently applying vivid probing such as "when was the last time this occurred", "how often does this occur", and "what is a typical occurrence like" to focus the conversation on typical occurrences, and last occurrences rather than peak only.

Halo effect: The tendency for positive or negative trails to "spillover" from one area to another Examples of queries that reduce bias following potentially biased interviewee responses may include detecting when a conclusion or reaction based on one area of conversation may be influencing the conversation surrounding a different area of conversation and subsequently applying vivid probing such as "when was the last time this occurred", "how often does this occur", and "what is a typical occurrence like" to focus the conversation on typical occurrences relating to the new area of conversation.

Bandwagon effect: The tendency to do (or believe) things because many other people do (or believe) the same Examples of queries that reduce bias following potentially biased interviewee responses may include detecting when a conclusion or reaction based on the opinions of others rather than personal experience may be influencing the conversation and subsequently applying vivid probing such as "when was the last time this occurred", "how often does this occur", and "what is a typical occurrence like" to focus the conversation on personal experience relating to the subject of conversation.

Expectation bias: The tendency to believe data that agree with expectations and to disbelieve, discard, or downgrade data that appear to conflict with expectations Examples of queries that reduce bias following potentially biased interviewee responses may include detecting when a conclusion or reaction may be based on prior expectations versus specific events and subsequently applying vivid probing such as "when was the last time this occurred", "how often does this occur", and "what is a typical occurrence like" to focus the conversation on typical occurrences, and last occurrences rather than peak only.

Wishful thinking: Predicting that positive outcomes are more likely than negative outcomes, a pattern common in story sharing Examples of queries that reduce bias may include periodically prompting the interviewer to remind the interviewee that the purpose of the interview is to learn not confirm and by emphasizing the value of constructive feedback. In the context of product development this is particularly important for concept, feature, and business model topics of conversation.

Well-trained interviewers integrate additional signals beyond just the individual spoken responses of the interviewee, in real-time, to develop a deeper and more accurate understanding of interviewee opinions, emotions, and behaviors and to direct follow up questioning accordingly. These signals may include: body language; voice inflection; bio-feedback; analysis of sentiment expressed and sentiment changes across the overall flow of the conversation.

The real-time integration of these signals allows the interviewer to detect convergence and divergence across the different signals. When signals converge the interviewer has greater confidence in the line of inquiry and resulting understanding and can follow up accordingly. When signals diverge it implies some degree of dissonance on the part of the interviewee. The interviewer can use the apparent dissonance to direct follow up questions or redirect the conversation to a different line of inquiry to better understand the apparent dissonance and underlying user emotions, opinions, and behaviors.

FIG. 1 is a block flow diagram of a system 100 illustrating components involved in querying an information source for information. A query client 110, such as a computer executing code is coupled to a query capture device 115. Query capture device 115 may include a microphone for use by a user in creating a series of queries to obtain information from a participant during a conversation. The queries may also include other information, such as information describing a product or service, or any other information desired to be communicated during a conversation with the participant. The queries may be read from a prepared script or ad-libbed by the user in order to obtain information.

The queries are communicated to an information source client 120, such as via voice over IP (VOIP), telephone, wireless, or other connection. Information source client 120 may be coupled to an information capture device 125 for use by a participant being queried. Both client or capture devices may include speakers to ensure the queries and information may be heard by the participant and user.

In one embodiment, the query and information comprises audio information which may be transcribed into text. The transcription may be performed by one or more clients, such as query client 110, or performed by a service coupled to receive the audio information. The text may be in any selected language, such as the language of the query or information, or a desired translation of the query or information language.

The transcribed text may include information identifying the source of the text, such as originating from the user of query client 110, corresponding to queries, and the user using information source client 120, corresponding to information provided by the participant in response to the queries. The transcribed text is provided to a query and information measurement function 130 for measuring the relative amounts of communication by the user and the participant being queried. Measurements may take the form of the number of characters of each, the number of words of each, or even the time associated with each of the queries and information provided. The measurements may be done by aggregating the relative times in one embodiment.

The measurements are provided to a proportion generator 135. The proportion generator 135 uses the measurements to determine a conversation mix value, which is a proportion of the amount of communications by the user to the amount of communications by the participant providing information responsive to the queries. A communication generator 140 generates a new communication, such as an indication regarding the conversation mix value, a suggestion for a new query, or even a new query to submit in the conversation as a function of the proportion of queries to information.

The new communication may be provided back to the query client, presented to the user, and may be used by the user to cause a new query or other communication to be sent from the client query device to the information source client.

In one embodiment, the new communication is generated responsive to the conversation mix value exceeding a threshold, or multiple thresholds. The proportion generator 135 compares the conversation mix value to a threshold. The threshold may be selected as a function of a type of the series of queries. The threshold may be higher for a first type of series of queries directed toward eliciting fact-based information and lower for a second type of series of queries directed toward eliciting opinion-based information. Note that the threshold in further embodiments may be the inverse of the threshold described above, with selections adjusted accordingly.

The communication may be selected by the communication generator 140 from a group of queries of varying open and closed ended type of queries such that when the proportion is greater than the threshold results in selection of an open ended new query. In one embodiment, the communication generator 140 may be in the form of a whisper bot, an intelligent device that generates new communications and sends the new communications to the user for use in querying for information. The term "whisper bot" is coined to describe a construct that essentially whispers suggestions for queries or provides new queries and/or information relevant to a user conducting a more robust conversation to obtain better information responsive to queries.

Figure 2:
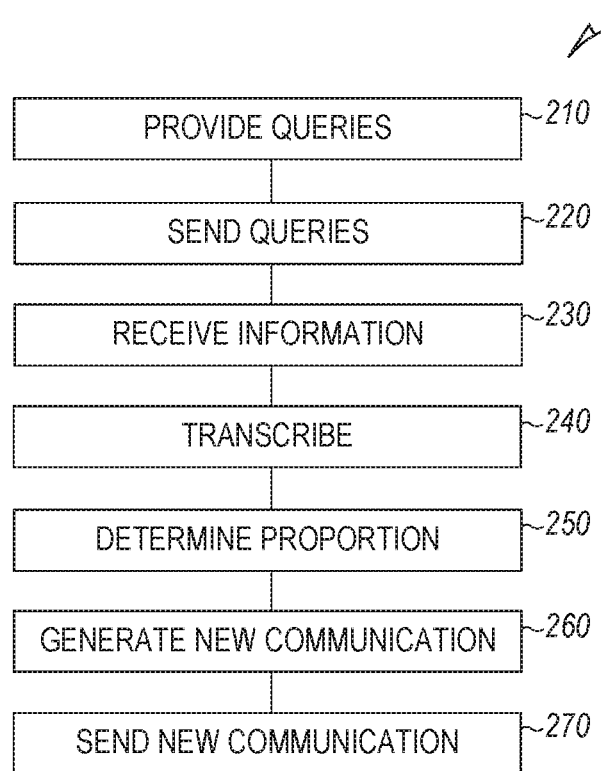
FIG. 2 is a flowchart illustrating a method 200 of determining information exchange proportions

FIG. 2 is a flowchart illustrating a method 200 of determining information exchange proportions, a conversation mix value, between a query generator and a data source being queried. At operation 210, a series of queries may be provided to an information source, such as a user via a client query device. The queries may be read by a person by a script or a programmed bot in various embodiments. The programmed bot may be a software agent, assistant, module, or other program that can run automated tasks, and may include machine learning or artificial intelligence programming. In other scenarios, the person reading the queries may have a general idea of information to obtain from the user, or a list of information. The person may then generate the queries based on such a list.

The queries may be serially sent at operation 220 via a communication connection, such as a voice, video, or text-based connection via the client query device to an information source client which a user may be using. Information from the information source client may be received at operation 230. At operation 240, the queries and information may be transcribed into query text and information text. A proportion of queries to information, the conversation mix value, is determined at operation 250 from the transcribed queries and information. At operation 160, a new communication, such as a query suggestion, new query, or a representation of the conversation mix value, is generated as a function of the proportion of queries to information. The new communication may be sent at operation 170 from the client query device to the information source client.

In one embodiment, the proportion of queries to information may be based on a count of the query text and information text. The count may be based on the number of letters in the query text and information text or on the number of words in the query text and information text.

In a further embodiment the proportion of queries to information is based on a first aggregation of time for a user to read the queries and a second aggregation of time for the information source comprising an interviewed user of the information source client to provide the information. The conversation mix value may be provided by a service, such as a transcription service provides transcriptions of the conversation. The conversation mix may alternatively be provided by a speaker identification service that recognizes speakers from audio signals or connection identifications and monitors relative times of each speaker talking. The speaker identification service may be part of or separate from the transcription service.

The new communication may be generated responsive to the proportion of queries to information exceeding a threshold. The threshold may be selected as a function of a type of the series of queries. The threshold may be higher for a first type of series of queries directed toward eliciting fact-based information and lower for a second type of series of queries directed toward eliciting opinion based information. The new query may be selected from a group of queries of varying open and closed ended type of queries such that when the proportion is greater than the threshold, an open-ended query may be selected as the new query.

Figure 3:
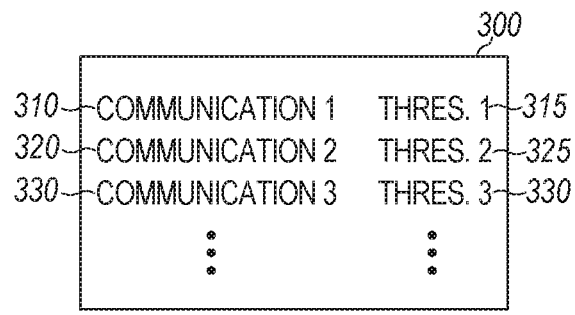
FIG. 3 is a table illustrating a spectrum of new communications during a conversation according to an example embodiment.

FIG. 3 is a table 300 illustrating a spectrum of new communications during a conversation. In one example, a next question in the script or list of information to be obtained during the conversation may be related to debugging apps as referenced above. In a further example, the next question may relate to describing the number of times per day that a service is being used. A closed ended question, communication 310 may be "Do you use the service every day?" Communication 320 is slightly more open-ended question: "How many times do you use the service per day?" Communication 330 may be "Why do you use the service and how often each day?" Several variations of questions utilizing a vivid interview may be included in table 300.

Based on the threshold, or multiple thresholds, one of the communications from table 300 may be selected. For instance, if the threshold is indicative of the user talking more than desired, a more open-ended question may be selected. In one embodiment, each question in table 300 may have an associated threshold as indicated at 315, 325, and 335. In further embodiments, the questions 310, 320, and 330 may be representations a level of vividness desired in a next question to be generated by query generator 140, as opposed to an actual question.

In one embodiment, the communications may be in the form of queries, suggestions for queries, an indication of the conversation mix value, an indication of a time remaining for the conversation, a suggestion to change from providing information to querying for information, or other communications to help elicit desired information.

Figure 4A:
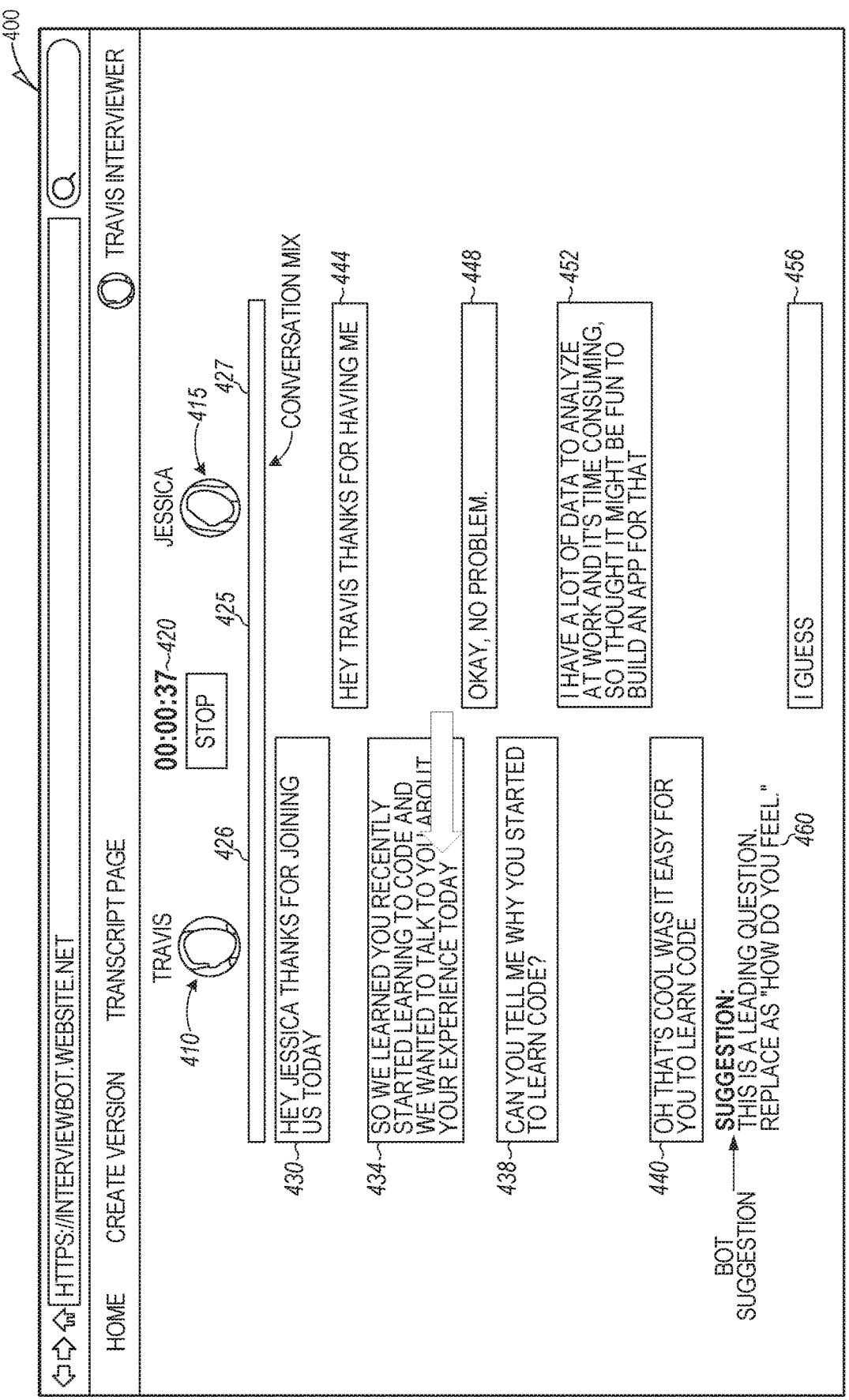
FIG. 4A is an example representation of a conversation conducted using the system according to an example embodiment.

FIG. 4A is an example representation 400 of a conversation conducted using system 100. A user—interviewer, Travis at 410 is querying a customer or participant 415 via a voice connection. The representation 400 may be provided to the user 410 for use in generating queries as shown under the user 410 and responses or information provided shown under the participant 415. A timer 420 may be included as shown, or placed elsewhere on the representation. The timer 420 may provide an indication of the time spent in the conversation, a time remaining in the conversation, or a time related to a particular topic during the conversation in various embodiments.

In addition or alternatively, a graphical representation of time or quantity of communications, such as a conversation mix bar 425 is shown. In one embodiment, the queries and portion of the conversation mix bar 425 attributable to the user may be shown in a first attribute, such as green at portion 426, with the responses or information is shown in a second attribute, such as red at portion 427. The conversation mix bar 425 is a graphical representation of the proportion of queries to information described above. The conversational mix bar 425 may be one form of a new communication and may be given an attribute, such as blinking, to communicate to the user that the conversation mix needs attention.

Communications generated by the user 410 are shown in chronological order at 430 (Hi Jessica thanks for joining us today). 434 (So we learned you recently started learning to code, and we wanted to talk to you about your experiences today.), 438 (Can you tell me why you wanted to learn to code?), and 440 (Oh that's cool was it easy for you to learn to code). Responses by participant 415 are shown at 444 (Hey Travis thanks for having me), 448 (Okay, no problem), 452 (I have a lot of data to analyze it work, and it's time consuming. So I thought it might be fun to build an app for that.), and 456 (1 guess). Note that most of the talking so far has been done by user 410, as indicated by portion 426 of the conversation mix bar 425 being larger than portion 427.

Note that question 440 (Oh that's cool was it easy for you to learn to code) was closed ended, inviting a short response, such as a yes, or no, or the received response 456 (I guess). At this point in the conversation, the communication generator 140 may note the proportion of conversation, as well as the closed ended query, and determine that it is time for a suggestion of a more open-ended query as the next query. The suggestion is shown at 460 (This is a leading question, Rephrase as: "How do you feel"). The suggestion in this case is simply a suggestion regarding how to rephrase the previous question, encouraging the user to ask a next question incorporating the suggestion with the previous question, such as "How do you feel about learning to code". In further embodiments, the suggestion could be the entire question rephrased.

In some embodiments, the suggestion may be obtained from a table, such as table 300 based on the conversation proportion or simply triggered by the use of a closed ended question. In further embodiments, the suggestion may be generated by a trained bot as described in further detail below.

In some embodiments, the conversation mix threshold may be changed during a conversation. For example, a user may be describing a new product or providing a tutorial about a new feature in a product during a first part of a conversation. The user is expected to talk more than the participant during such first part of the conversation. The conversation mix threshold may be set to a value reflective of that expectation during the first part of the conversation. A second part of the conversation may involve asking users about the new feature, if it solves some problems, if there were problems encountered during using the new feature, etc. This second part of the conversation should have a conversation mix that is slanted toward the participant, as a goal is to elicit representative and relatable data.

Figure 4B:
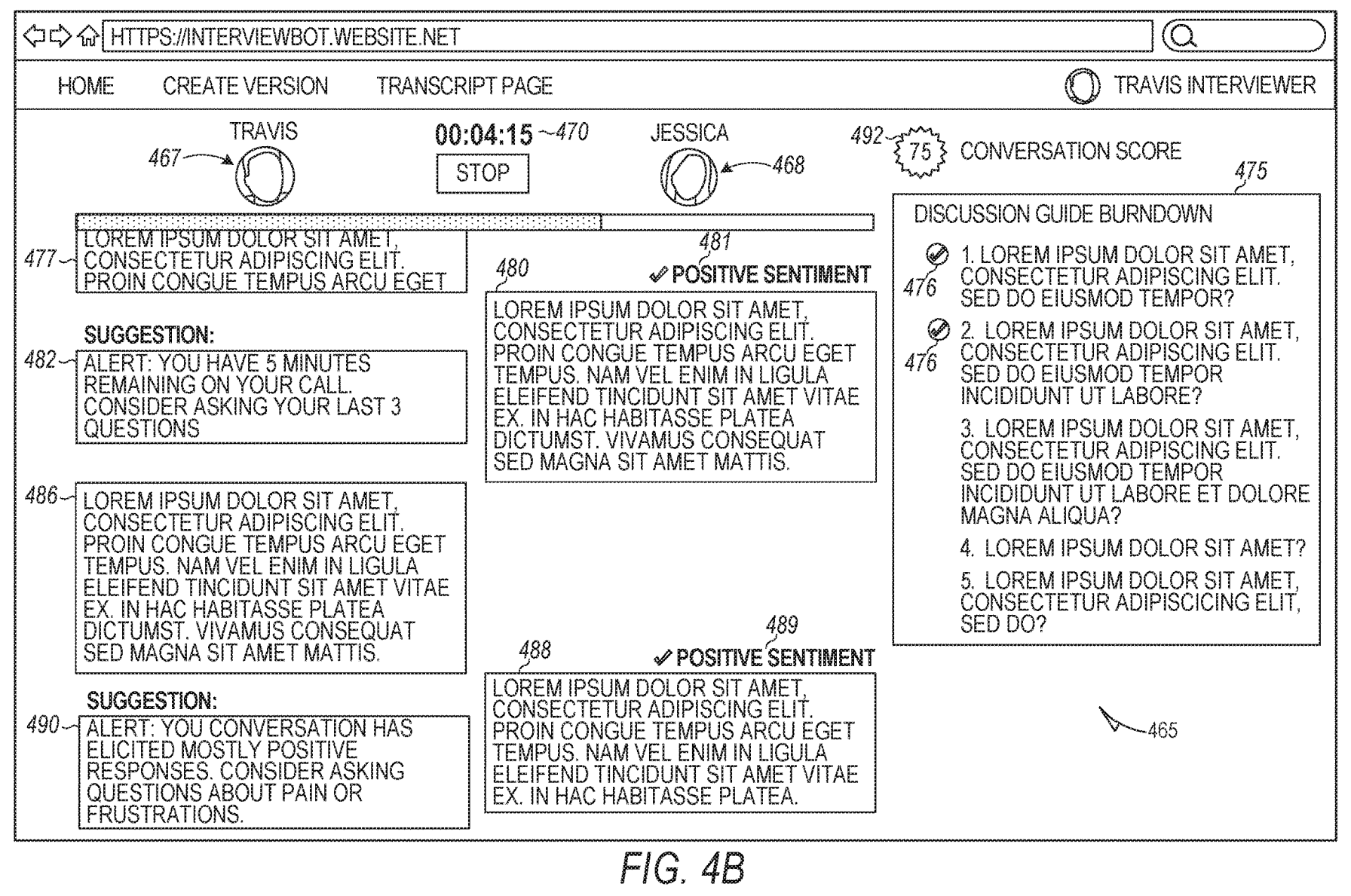

FIG. 4B is an example representation 465 of a conversation conducted using system 100. The conversation is illustrated as between an interviewer 467 and a customer 468. A time remaining indicator is shown at 470 and is representative of the time remaining following all the shown interview statements. A discussion guide 475 lists questions to be asked during the interview. The discussion guide 475 acts as a burndown list in one embodiment for use in determining if all planned questions have been dealt with in a limited time conversation. Checkmarks 476 indicate questions already asked. The query and information measurement function 130 compares the text from the conversation to the questions and determines which questions have already been addressed during the conversation. Two of the five questions are illustrated as having been addressed.

In one embodiment, two different types of burndown lists, may be used. A first, question coverage burndown list tracks coverage metrics for any question that the interviewer pre-loaded into the communication generator 140, also referred to as a "whisper-bot" prior to the interview in the form of a discussion guide. A second interview coverage burndown list, such as burndown list 475 tracks coverage metrics for how much of the total set of query suggestions coming in real-time from the bot that the interviewer follow up on. The first, question coverage burndown list allows the communication generator to dynamically monitor coverage of a topic set expressed as an intent to cover before the interview started. Coverage metrics may be provided by the query and information measurement function 130 by matching syntax of the discussion guide topics and the queries posted by the interviewer 467.

Based on the monitoring of coverage, the communication generator provides the interviewer 467 the ability to open a detailed view, discussion guide 475, of the questions they intended to cover but have not yet covered during the interview. The second interview coverage burndown list 475 allows for the fact that as the interview progresses in real-time the interviewer 467 may not be able to follow up on all whisper-bot suggestions as they occur. As the conversation progresses the advice will quickly get pushed out of the visible conversation record. The burndown feature allows the interviewer to go back at any time in the discussion guide view and see a complete record of bot suggestions that they did not interject into the interview. In one embodiment, the suggestions may be correlated to and listed with each question in the burndown list 475.

The conversation is divided between the interviewer 467 in a first column and the customer 468 in a second column. The text for both columns is somewhat random and not representative of an actual conversation. The conversation is now described in sequential order. A first question 477 results in a response 480. The response is processed by query and information measurement function 130 and is noted as having a positive sentiment at 481 by query and information measurement function 130. Query and information measurement function 130 notes at this point in the conversation that only two of the five questions have been addressed, and that there are five minutes remaining for the scheduled conversation. Communication generator 140 generates a suggestion 482, informing the interviewer 467 of that fact, and encouraging asking of the last three questions.

A further question 486 is then communicated, resulting in a response 488, that is found positive at 489 by the query and information measurement function 130. At 490, the query and information measurement function 130 determines that responses have been mostly positive to date and prompts the communication generator 140 to suggest to the user at 490 of that fact, and prompts the user to consider asking a question about pain or frustration. The positive and negative sentiments may be thought of as a second burndown list, that deals more with emotions of the customer as opposed to fact-based data.

In one embodiment, a conversation score 492 is maintained on a scale from 0 to 100 (best) in one embodiment. Other scales may be used in further embodiments. The query and information measurement function 130 may be used to determine the conversation score, which may be based on the vivid grammar. The more a conversation utilizes the vivid grammar the better. The score may be determined as an average of a vivid grammar confidence level in one embodiment.

Figure 5:
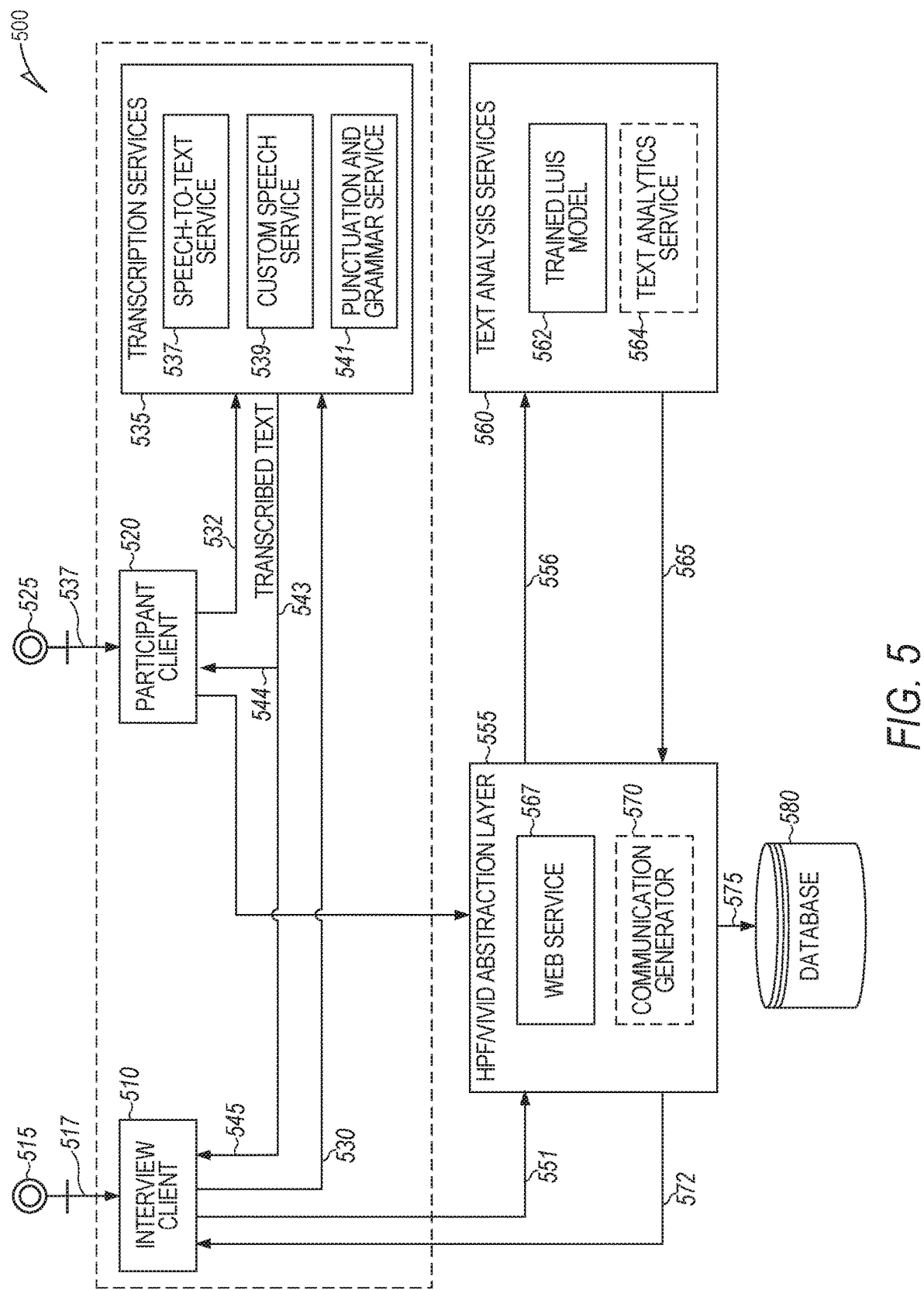
FIG. 5 is a block diagram of a system for generating query suggestions according to an example embodiment.

FIG. 5 is a block diagram of a system 500 for generating query suggestions. A query client 510, such as a computer executing code is coupled to a query capture device 515. Query capture device 515 may include a microphone for use by a user in creating a series of queries to obtain information from a participant. The queries may be read from a prepared script or ad-libbed by the user in order to obtain information.

The queries are communicated to an information source client 520, such as via voice over IP (VOIP), telephone, wireless, or other connection. Information source client 520 may be coupled to an information capture device 525 for use by a participant being queried. Both client or capture devices may include speakers to ensure the queries and information may be heard by the participant and user.

In one embodiment, the query and information comprise audio information which may be transcribed into text. Audio information from clients 510 and 515 may be provided via respective connections 530 and 532 to transcription services 535. Transcription services in one embodiment may include a commercially available service that may include speech to text services 537, custom speech service 539, and punctuation and grammar service 541. In one embodiment, transcription service 535 comprises network-based service that may be coupled directly to the respective clients and provide transcribed text via a connection 543 to client 510 via connection 545 and to client 520 via connection 544 to allow the user and participant to view the text of their conversation during their conversation. Transcriptions may alternatively be performed by the one or more clients 510 and 515.

The transcribed text may be in any desired language, and include information identifying the source of the text, such as originating from the user of query client 510, corresponding to queries, and the user using information source client 520, corresponding to information provided by the participant in response to the queries. The transcribed text is also provided via connection 551 to a grammar extraction layer 555 and via connection 556 to text analysis services 560. Text analysis service 560 may include a trained LUIS model 562 and text analytics services 564. LUIS is a commercially available machine learning-based service in Microsoft Azure that may be used to build natural language understanding into apps, bots and internet of things devices. LUIS models may customized for a problem to be solved, and continuously improve with usage and training. Other such services may be used to generate model 562 in further embodiments. Model 562 may be trained to identify closed and leading questions, as well as questions that may reflect bias in some embodiments. Model 562 may also be modified based on the grammar for each different scenario or domain.

In one embodiment, model 562 may be trained using intents, entities, and phrase lists. Intents identify what LUIS should do, such as, identify closed questions. Entities are the individual types of words in a sentence, such as nouns, verbs, adverbs, etc. A phrase list may be actual queries or utterances, such as questions or statements made during conversations.

The output of model 562 may be provided via connection 565 to the grammar extraction layer 555 as a probability that the question is closed or leading. The probability may be used by a web services component 576, or whisper bot, to determine whether or not to make a suggestion. If the decision is to make a suggestion, the suggestion may be obtained from a communication generator 570, which may be in the form of a table of suggestions based on the probability and text analysis provided by text analytics service 564. In further embodiments, communication generator 570 may be a trained bot that generates suggestions as a function of training that includes many different labeled examples of output from the services 560. The suggestion, along with the analysis from services 560 may be provided via connection 572 to client 510 for display as a new communication.

Thus, after receiving information from LUIS (and the like) about what the probability is in terms of what the interviewee is talking about, there can additionally be a 'dialog management' bot such as communication generator 570 that then ingests logic about how to hold the conversation in such a way that it feels natural to both of the humans involved (both the interviewer, in terms of the suggestions they are getting to help improve their interview—and to the interviewee, in terms of the follow-up questions being suggested, for example).

The communication generator 570, also referred to as a dialog management bot finds out what the most reasonable and natural thing is to say in response to the user. Some example responses include: a direct suggestion for a follow-up question when the situation is clear, a question to elicit more information to make a more informed decision (in this situation, the dialog management bot asks for 'slot filling' information—for example, if there is a JTBD action without a direct object, it might ask the interviewer to ask the customer what it is they are debugging), stating that it does not understand what the user said, prioritizing potential response suggestions taking into account which follow-up questions had already been asked, and which questions would lead to the more vivid description, asking a question to double-check that both the interviewer and the bot understood what the interviewee said (the term for when the bot checks its own conclusions is 'grounding'), etc. The dialog management bot can even take the burndown list and conversation mix timestamp, to decide whether to help the interviewer move on to a different topic (e.g., to address more of the topic in the burndown) or to stick with the same topic (e.g., to ask certain questions that would provide them with a vivid story to tell post-interview).

In one embodiment, one or more web or network-based services may be used by the dialog management hot to manage conversation flow and communication suggestion generation. Microsoft Azure may be used to manage conversation flow with dialogs in one embodiment. Other example services include AnA maker, LUIS and scorables, and/or Project Personality Chat. The combination of these services and others allow follow-up questions, or suggestion for additional queries that are suggested to flow naturally in a current conversation.

In one example conversation, a customer may mention something about having a problem with debugging. The our LUIS trained model 562 detects that the customer mentioned a pain point: problem. Model 562 will also detect a "Job-to-be-done action": debugging.

Ideally, the dialog management bot 570 will be provided this information by model 562 and will start by realizing that there's information missing: a Job-to-be-done action, but no direct object. The bot 570 will generate a communication to first ask, "What are you debugging when you run into problems?" The customer would then provide the direct object, e.g., "I run into trouble when I debug Python code using Visual Studio Code."

Another (more common) type of feedback bot 570 provides would be about which follow-up response to provide after an intent has been detected by LUIS. So in the example above, LUIS will detect that the customer has brought up a problem with the task "debug Python using VS Code".

These are example follow-up questions for a problem statement:

| Grammar | Question |
| --- | --- |
| Who/What | What problems or challenges do you face |
| Who/What | Do you experience this particular problem |
| Who/What | What products, services, or technologies do you use to help with this problem |
| Who/What | What, if any custom workarounds have you tried |
| Who/What | Who else experiences this problem |
| When | When was the last time you had this problem |
| When | When was the worst time this problem occurred |
| When | When during you workday/week/month does it typically happen |
| Where | Where were you when it last occurred |
| Where | Where are you when this problem typically occurs |
| How | How does this problem typically occur |
| How | What happens before it occurs |
| How | What happens after it occurs |
| How Much | How often does the problem occur |
| How Much | How much time do you spend on it |
| How Much | How problematic is it |
| How Much | What is your biggest pain point or frustration relating to this problem |
| How Much | How painful or frustrating is it |
| How Much | How well is your current approach to dealing with this problem working |
| How Much | How satisfied are you with your approach |
| Why | What motivates you to want to find a better solution to this problem |
| Why | If you don't do better at addressing this problem what will you lose |
| Why | If you find a better solution to this problem what will you gain |

This grammar may be provided as a list accessible via lookup based on the input from model 562, or may be classifications of a machine learning service trained to recognize various intents.

Based on what information has already been collected about this problem and/or job-to-be-done, the bot 572 would not suggest those questions again. In one embodiment, bot 572 might start with the following question: "How does this problem typically occur?", and add: "How often does the problem occur?" and "What, if any, custom workarounds have you tried?" and "How satisfied are you with your approach?"

In one embodiment, the bot may suggest multiple follow-up questions from the same set, to dig into the context of the problem and get a rich story. Therefore, the bot may be trained to ask the next question from a different grammar category than the ones it has suggested to ask or asked (e.g., a 'how much' question, if the bot 572 has already provided a 'when' and a 'where').

In a further embodiment, the bot 572 may be trained to stop providing follow-up question on the same topic, once the bot 572 has already suggested or asked 3-4 questions. The interviewer is thus helped to move on to the next topic, when enough of a rich story has been collected.

After receiving information from LUIS (and the like) about what the probability is in terms of what the interviewee is talking about (say a certain frequently performed task) the dialog management bot may also ingest logic about how to hold the conversation in such a way that it feels natural to both of the humans involved:
  a. for the interviewer: in terms of the suggestions they are getting to help improve their interview, and
  b. for the interviewee: in terms of the follow-up questions being suggested, for example The dialog management hot thus finds out what the most reasonable and natural thing is to say in response to the user. Some example responses include:
  a. a direct suggestion for a follow-up question when the situation is clear,
  b. a question to elicit more information to make a more informed decision (in this situation, the dialog management bot asks for 'slot filling' information—for example, if there is a task verb without a direct object, it might ask the interviewer to ask the customer what it is they are debugging),
  c. stating that it does not understand what the user said, And in addition, the bot 570 may include:
  a. prioritizing potential response suggestions taking into account which follow-up questions had already been asked,
  b. and which questions would lead to the more vivid description,
  c. asking a question to double-check that both the interviewer and the bot understood what the interviewee said (e.g., 'grounding'), etc.
  d. The dialog management bot can even take the backlog list and how much time is left over in the interview, to decide whether to help the interviewer move on to a different topic (e.g., to address more of the topic) or to stick with the same topic (e.g., to ask certain questions that would provide them with a vivid story to tell post-interview).

The model comprising bot 570 may be trained to understand when a verb or direct object is missing from the composite, and to prioritize finding out more info to complete the JTBD.

Training may be done by asking a set of 3-5 questions (depending on how long and detailed the responses take) from different 'vivid grammar' categories to record a rich story. The bot 570 may also be trained on switching topics once the 3-5 questions have been asked on that one topic.

Figure 6:
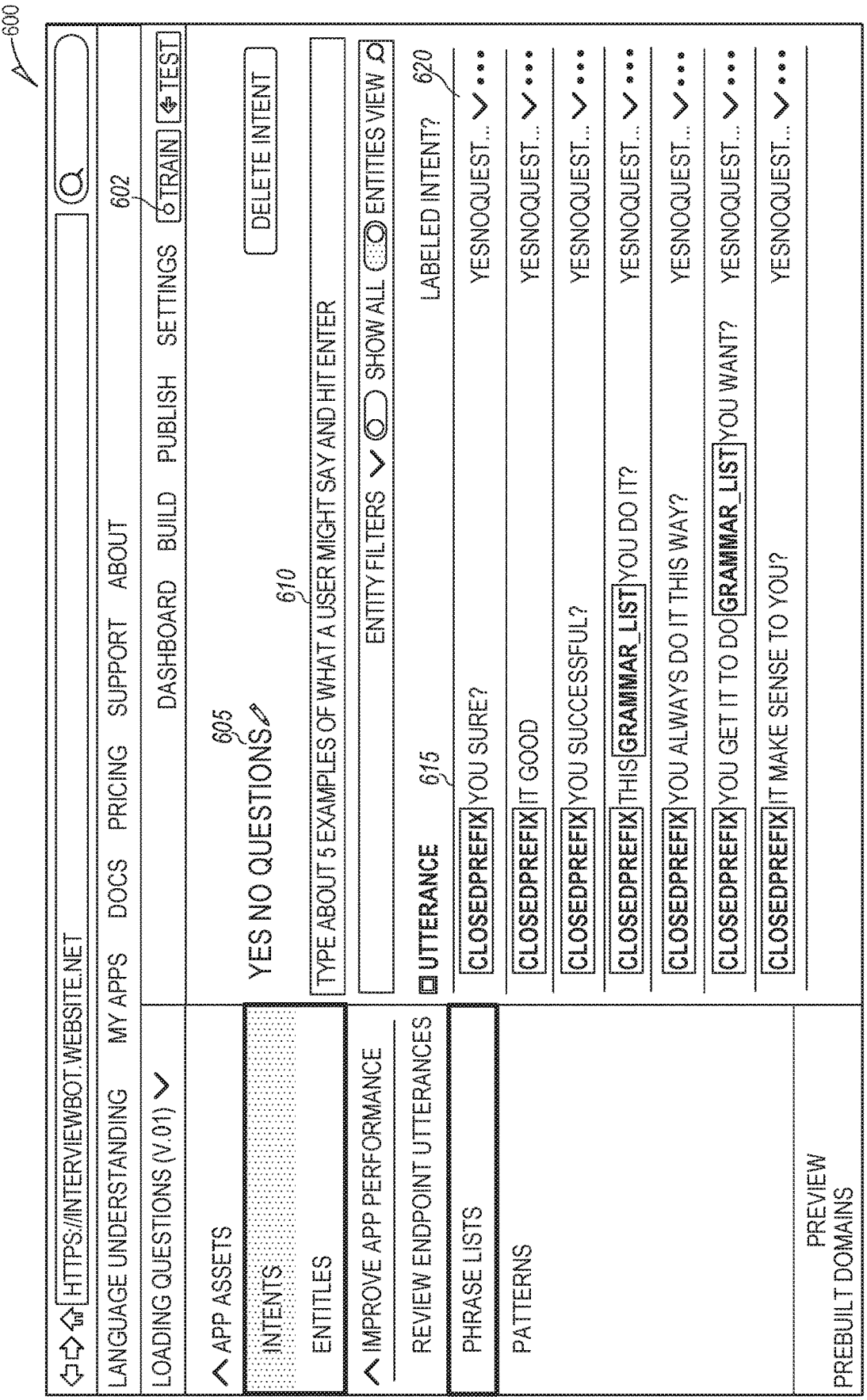
FIG. 6 is a screen shot of an example a user interface showing an intent page used for training a vivid conversation model according to an example embodiment.

FIG. 6 is a screen shot of an example LUIS user interface showing an intent page 600 used for training model 562 as indicated by a selected train user interface element 602. Intent page 600 shows an intent for detecting closed questions. Intents are types of queries that meet a defined type, such as questions that may be answered with a yes or a no, as indicated at 605, which are closed ended questions. A data entry box 610 may be used to enter examples of what a user might say. In one embodiment, a phrase list is shown at 615 containing multiple utterances and a corresponding label 620, selectable via drop down menu, consistent with the intent. The entities and phrase lists are used to instruct LUIS how best to identify the intent of an utterance.

In one embodiment, a training set of phrases was developed from an analysis of discussion guides, interview scripts product managers have used, and online question repositories. Closed questions were identified as phrases starting with commonly used auxiliary verbs (such as, "do", "can", "would"). The identified questions were entered in page 600 as examples of closed questions to teach the model that closed questions usually start with an auxiliary verb and called them 'ClosedPrefix' in the vivid grammar. The model so trained was able to detect syntactic patterns and semantic patterns useful in detecting closed questions.

Figure 7:
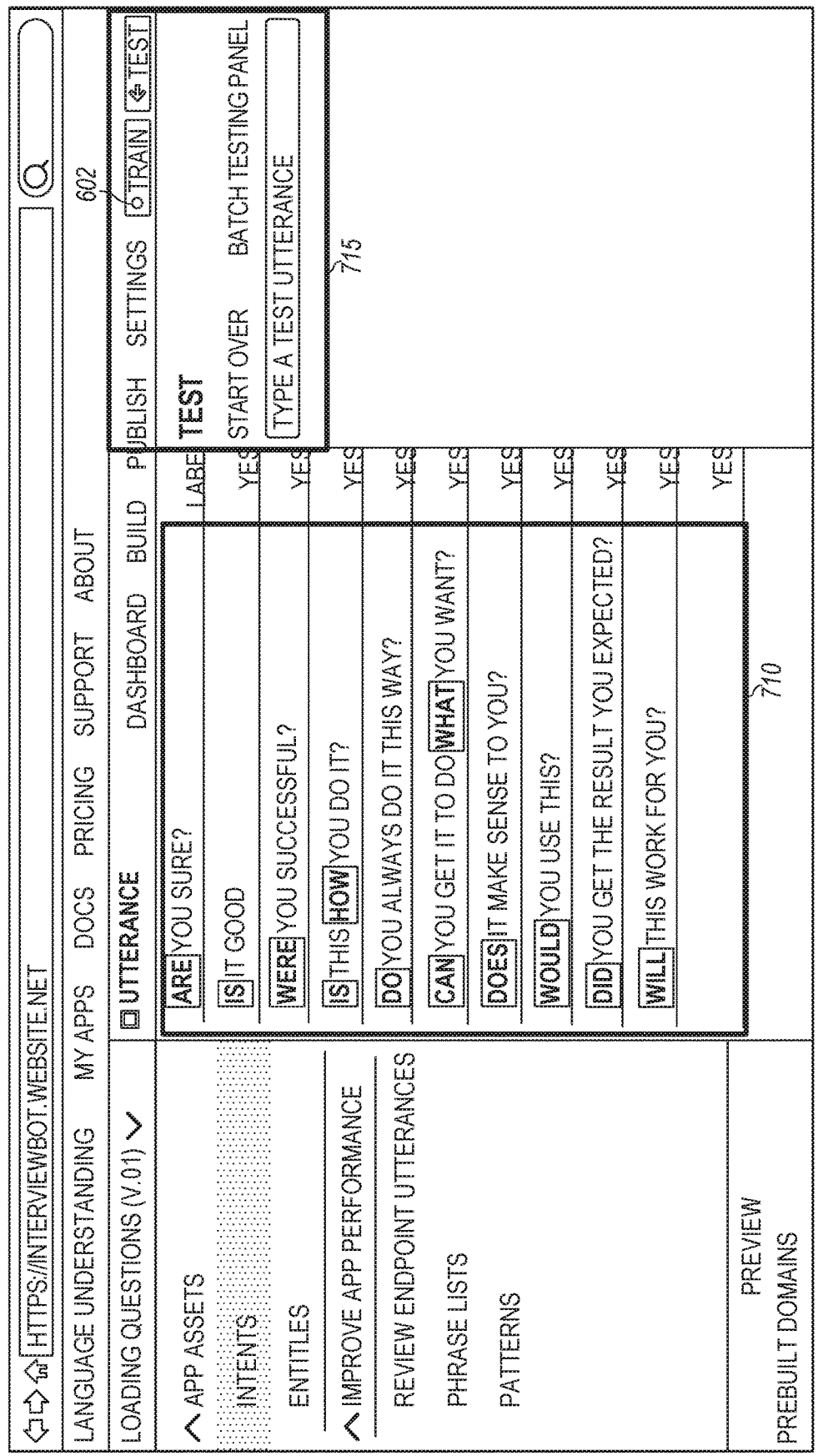
FIG. 7 is a screen shot of an example interface illustrating sentences used to train the vivid conversation model for closed ended questions in a token view according to an example embodiment.

FIG. 7 is a screen shot of an example interface 700 illustrating sentences used to train the model for closed ended questions in what is called a token view. Areas of the interface 700 are designated by a first added rectangle 710 that highlights some sample "utterances" on which the model was trained. Some examples include: "are you surer?", "it is good?", "were you successful?", "is this how you do it?", and "do you always do it this way?" Utterances are a smaller set of particularly representative examples on which the model is trained (e.g., with bigger syntactic or grammatical differences). In one example, model 562 is trained on 16 utterances for this particular closed ended or yes/no question intent. Other sized training sets may be used in further embodiments, and with different services. And the tokens (highlighted words such as "is") show examples of the verbs that LUIS learned were 'ClosedPrefix' types of auxiliary verbs.

The second added rectangle 715 highlights where several 'test' sentences were entered. The test sentences can be thought of as the test set to ascertain the accuracy of the model in classifying utterances. With every utterance entered as a test, it can be determined whether each test utterance is being correctly classified by the model 562. If incorrectly classified, the model is continuously trained by providing the correct answer for a particular sample utterance.

Figure 8:
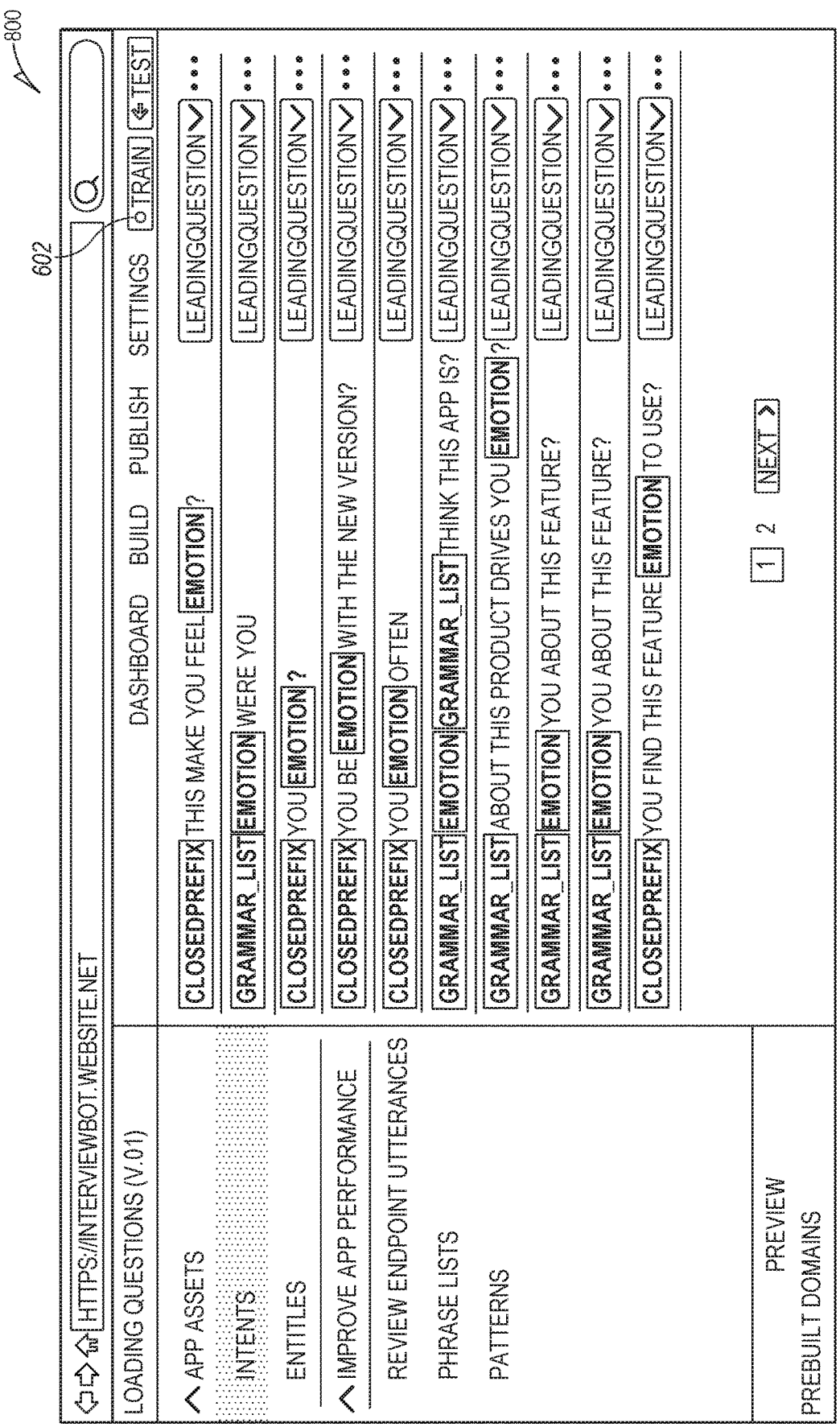
FIG. 8 is a screen shot of an example interface illustrating sample utterances for determining a leading question intent according to an example embodiment.

A similar analysis of questions reveals adjectives and adverbs as parts of the question grammar for leading questions. Screen shot 800 in FIG. 8 illustrates sample utterances (with the grammar outlined—through the highlighted entities) for a LeadingQuestions intent. Switching the view over to 'tokens', at screen shot 900 in FIG. 9, example tokens replacing the Closed Prefix, Emotion, Grammar_List, and Emotion entities are illustrated. 16 utterances, more or less, may be used to train the Leading Questions intent, or part of the model, and many more 'Test' samples to test accuracy and correct the model along the way. The utterances may include a diverse set of grammar, structures, and syntax in some embodiments. Examples include: "did this make you feel angry?", "how angry were you?", and "were you happy?".

Another feature used to leverage understanding of the grammar of good questions is phrase lists illustrated in screen 1000 of FIG. 10. The phrase lists screen 1000 includes names of different types phrases lists such as Emotions 1010, jobs to be done (JTBD) actions 1015, JTBD_Direct_Objects 1020, and a Problem_Indicator 1025. Each phrase list includes a sample of various words or values indicative of the type of phrase list. For instance, the emotions phrase list 1010 includes values "angry, sad, happy, unhappy, scared, annoyed, frustrated, content, depressed, bad, confused, enraged, anxious, disappointed, worried, upset, embarrassed, nervous, bored, shocked, excited, dissatisfied, tired, surprised, overwhelmed, pleased, irritated, thrilled, afraid, frightened, disgusted, stressed, amazed, impressed, relieved, amused, delighted, fascinated, stunned, satisfied, intrigued, horrified, offended, astonished, outraged, blown away, saddened, startled, astounded, surprised, dismayed, appalled, puzzled, terrified, overjoyed, bemused, mesmerized, heartened, elated, infuriated, like, good, crazy, insecure, etc." The JTBD actions 1015 may include "edit, compile, debug, development, code, testing, monitoring, managing, manual testing, UI testing, release, publish, deploy, distribute, build, continuous integration, continuous deployment, set up, design, modify, test, analyze, diagnose, plan, planning management, maintenance, develop, manage, research, implement, maintain, create, production, training, debugging, coding, working, deploying, distributing, compiling, designing, delivering, writing, collecting, researching, editing, reviewing, publishing, communicating, creating, programming, configuring, coordinating, pull request, organizing, evaluating, deleting, storing, reading, marketing, overwriting, etc." JTBD_Direct_Objects 1020 may include "apps, applications, containers, websites, services, functions, desktop, code, laptop, tablet, backlog, Xamarin C++, C, C#. PHP, Java. JavaScript, TypeScript, MySQL, jQuery, Android, iPad, Laptops, HTML, Notebook, Python, Visual Studio, App Center, Visual Studio Code, features, capabilities, job, task, screen, feature, functionalities, infrastructures, methods, platforms, targets, systems, devices, environment, framework, model, tools, technology, data, architecture, policies, ecosystems, web service, etc." Problem_Indicator 1025 may include values of "not easy, hard to find, not successful, not certain, not efficient, not good, not simple, not consistent, not friendly, does not work, not natural, not fast, hard, harder, missed, unclear, hidden, failure, mistake, error, uncertain, misunderstood, inefficient, poor, bad design, inconsistent, unfriendly, doesn't work, cumbersome, odd, slow, long, unproductive, ineffective, not useful, out of control, not as expected, disempowering, not satisfied, not fun, wouldn't recommend, not compelling, not innovative, least favorite, dissatisfied, horrible, painful, reject, oppose, unconvincing, unoriginal, stale, untrustworthy, distrust, not confident, not comfortable, confused, hate, awful, boring, unpleasant, annoying, busy, complex, confusing, dated, difficult, disconnected, disruptive, distracting, dull, fragile, frustrating, gets in the way, hard to use, impersonal, incomprehensible, intimidating, inviting, irrelevant, not secure, not valuable, old, organized, overbearing, overwhelming, patronizing, poor quality, rigid, simplistic, sterile, stressful, time-consuming, too technical, unapproachable, unattractive, uncontrollable, unconventional, complicated, undesirable, unrefined, incompatible, stringent, tough, overwhelming, messy, don't understand, not great, undiscoverable, unsuccessful, unnatural, not quick, insecure, unreliable, unresponsive, dissatisfying, unhappy, inaccessible, unreachable, unattainable, uncomfortable, incomplete, inconvenient, antiquated, not easy to use, unexpected, unfamiliar, inflexible, not helpful, uninspiring, fractured, unintuitive, demotivating, disorganized, unpredictable, unprofessional, unsophisticated, unstable, hard to understand, unusable, indecisive, closed, problem, fixing, trouble, trouble shooting, repairing, fix, difficulties, unpredictable, etc." Note that the illustrated phrase lists are related to the product development domain or scenario, and that different domains may have different phrase lists which will be readily ascertainable to someone of skill in that domain.

In one embodiment, the phrase lists are selectable to provide an edit phrase list screen. A create new phrase list button 1030 or other user interface construct may also be used to navigate to an edit phrase list screen 1100 in FIG. 1. The emotion phrase list screen is displayed in FIG. 11 and includes a name field 1105, a value 1110, a phrase list values portion 1115, and a related values portion 1120. The name field 1105 is show with the emotions phrase list label. Phase list values may be added in the value field 1110 and may be separated by commas in one embodiment. Clicking on or otherwise selecting add all 1125 or hitting an enter key moves the entered values to the phase list values portion 1115. Selecting any value in the portions 1115 or 1120 will move the selected value to the other portion. The related values may be provided based on a thesaurus type lookup of values related to the values in the phrase list portion 1115. A save button 1130 may be used to save changes made.

Phrase lists allow seeding LUIS with a list of terms frequently observed in leading questions—in this case, emotions. When LUIS detects a term specifically used in a Phrase list, that term gets increased weight and importance. So, in this case, if a particular emotion from the phrase list is detected in a sentence, the model more strongly connects that sentence to the leading question type.

JTBD_Actions and JTBD_Direct_Objects are strong indicators that the conversation is about a "job-to-be-done" or a type of task that a customer would perform: the 'direct object' is the object that's being acted upon through the customer's job-to-be-done, and the 'action' is the actual job that they're performing (e.g., debugging code: 'debugging' is the action, 'code' is the direct object).

Finally, the Problem_Indicator Phrase list is a set of terms that have been observed being used in a conversation relating to a customer describing a pain point they have.

In one embodiment, LUIS may be trained to detect the intersection of the entities in a domain grammar and the vivid-grammar. Every 'cell' of a table covering "HPF steps x vivid-grammar question type" may be covered. In other words, each of the customer, problem, concept, feature, and business steps or stages of the HPF will have associated question types and the model 562 will be trained to classify utterances for each step.

FIG. 12 illustrates at 1200 a list of Intents on which model 562 has been trained to detect, including Problem and Jobs-To-Be-Done. The problems include how, how much, where, who/what, and why. JTBD includes how, how much, when, where, who/what, why. Also included is a communication confirm intent, a leading question intent, and yes not questions intent. The number of labeled utterances used for training each intent is also illustrated. The numbers are just examples, and in further embodiments, and especially in further domains, different intents and different numbers of training utterances may be used.

In order to detect critical clauses in questions that enable detection of whether something is a who/what, how much, when, where, how, or why question, a vivid grammar list, Grammar_List entity may be defined. FIG. 13 is a list 1300 of normalized values 1305 and synonyms 1310 making up a vivid grammar list. Normalized values 1305 may include the following values: How, how much, what, when, where, who, and why. As can be seen in the synonyms 1310 list, the how value may be equivalent to phrases, such as how do you, what happens after, etc. Similar synonym phrases are included for each of the normalized values. Detection of a synonym in an utterance may be normalized for use in the model 562 to help determine the type of vivid question being asked.

Figure 14:
FIG. 14 illustrates types of entities defined in a vivid conversation model in one embodiment related to a product development domain according to an example embodiment.

FIG. 14 illustrates at 1400 the types of entities defined in a vivid conversations model 562 in one embodiment related to the product development domain. A create entity button 1405 may be used to add an entity to the list, and selecting the name 1410 of the entity may be used to edit an existing entity. Example entities in one embodiment include ClosedPrefix, Emotion, Grammar_List, JTBD_Action, JTBD_Composite, JTBD_Object, Problem_Indicator, and closed question starter. Types of entities are also shown at 1415 and include simple, list, and composite. The number of labeled utterances 1420 associated with each entity is also illustrated.

Figure 15:
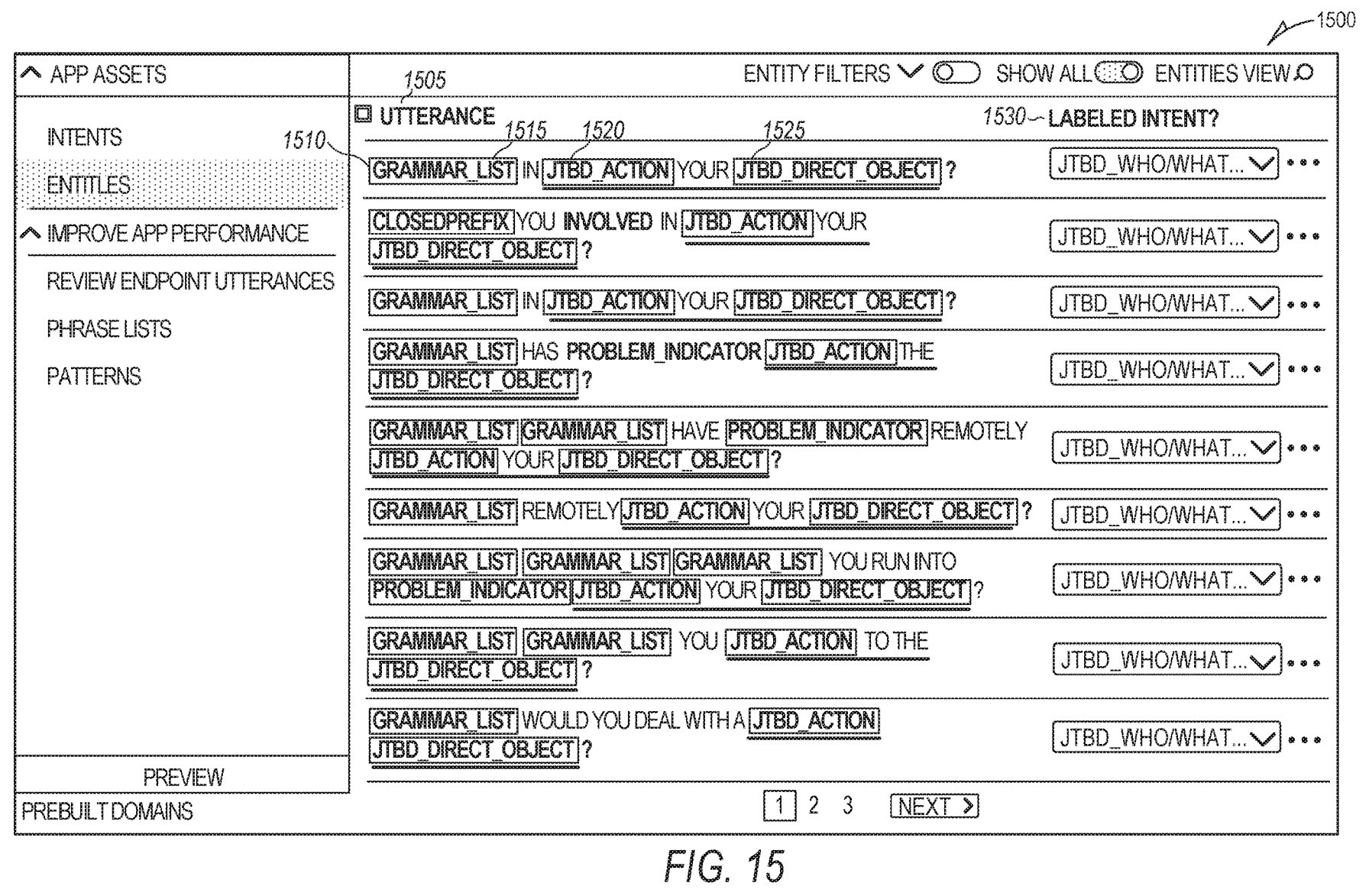

FIG. 15 is a screen shot 1500 illustrating a JTBD_Action entity defined in FIG. 14. The view is an entity view, and shows the utterances 1505 parsed by entity. For instance, the first utterance 1510 has replaced values with corresponding entities Grammar_List 1515, JTBD_Action 1520, and JTBD_Direct_Object 1525. Each of the succeeding utterances has been similarly parsed. A labeled intent 1430 is also included and may be selected via a drop down menu in one embodiment.

FIG. 16 is a screen shot 1600 illustrating the same JTBD_Action entity again, but this time with example tokens filled in for the entities. The tokens in each utterance 1605 are highlighted.

Under labeled intent 1610, the vivid question LUIS is detecting for a corresponding utterance is shown. LUIS will classify each utterance to be the type of question that's listed first in the list (highest probability match). In the case of. "Who is involved in debugging your mobile app?" 1605, for example, our LUIS model is 86% sure that the type of this question is a 'who/what' question about a 'job-to-be-done'. The labeled intent for utterance 1605 is expanded to include probabilities or confidence corresponding to how LUIS is using the combination of nouns, verbs, adjectives, and adverbs in the grammar to classify questions by the combination of HPF topic they relate to and what vivid-grammar dimension they are probing into. For each question or utterance, the degree of confidence that LUIS has that it has properly classified the question is shown.

Looking at some of the other examples moving from the Entity view in FIG. 15 to the Tokens view in FIG. 16: one can see examples of the "Grammar_List" tokens LUIS is detecting to classify the type of vivid-question, and the "JTBD_Action" and "JTBD_Direct_Object" it is detecting to classify as tasks/jobs, and the "Problem_Indicator" it is picking up on as adjectives and adverbs that indicate a problem is the topic of interest.

Figure 17:
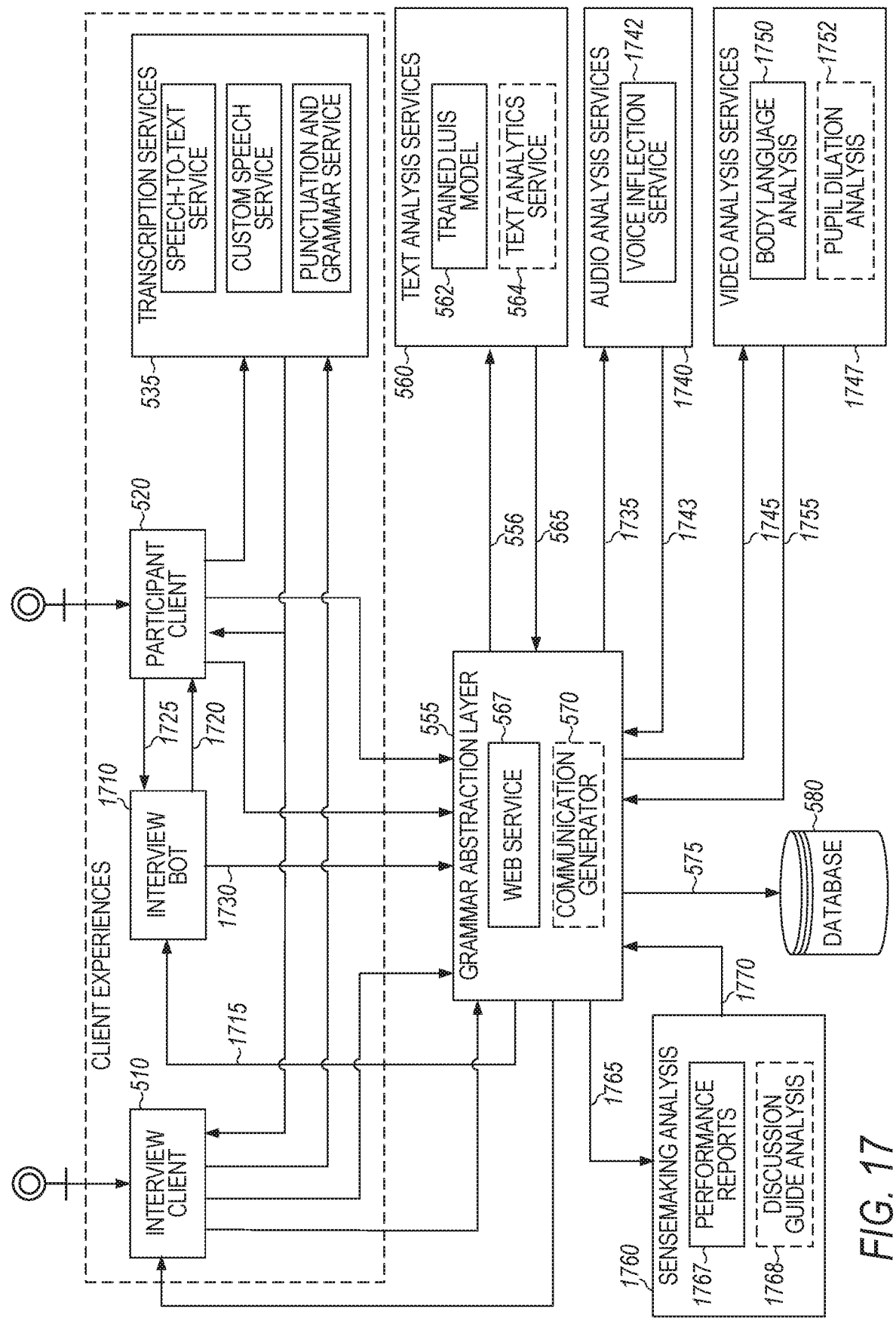
FIG. 17 is a block diagram of a system for generating query suggestions illustrating additional components compared to FIG. 5 according to an example embodiment.

FIG. 17 is a block diagram of a system 1700 for generating query suggestions illustrating additional components compared to FIG. 5, with like elements having the same reference numbers. In one embodiment, the grammar abstraction layer 555 provides a dialog response to an interview bot 1710 via connection 1715. The dialog response may be an actual question or other communication to be communicated via a connection 1720 to information source client 520 in the form of text or voice.

The response from information source client 520 is provided via connection 1725 to the interview bot 1710 and on to the grammar abstraction layer 555 via a connection 1730. The response is also provided via connection 556 to text analysis services 565 for further processing and the provision of an analysis, including output from model 562 via connection 565.

In one embodiment, audio of one or more of the user and participant may be provided via connection 1735 to an audio analysis service 1740 for analysis by a voice inflection service 1742. Results of the voice inflection may be provided as data representative of voice inflection back to grammar abstraction layer 555 via connection 1743 for use in generating communications. Similarly, video of one or more of the user and participant may be provided on a connection 1745 to a video analysis service 1747, which may include one or more video analysis services, such as body language analysis 1750 and pupil dilation analysis 1752. Data representative of the video analysis may be provided to the grammar abstraction layer 555 via a connection 1755 for use in generating communications.

In a further embodiment, a data analysis service 1760 receives a communication suggestion, along with the analysis from services 560 from the grammar abstraction layer 555 via a connection 1765. The data analysis service 1760 may include performance report services 1767 and discussion guide analysis service 1768 to provide information on connection 1770 regarding the query sessions to help determine trends and provide a statistical analysis of problems and other information associated with the specific domain. The information provided via connection 1770 to grammar abstraction layer 555 may be used to improve the communication suggestions in order to improve the effectiveness of query sessions.

Figure 18:
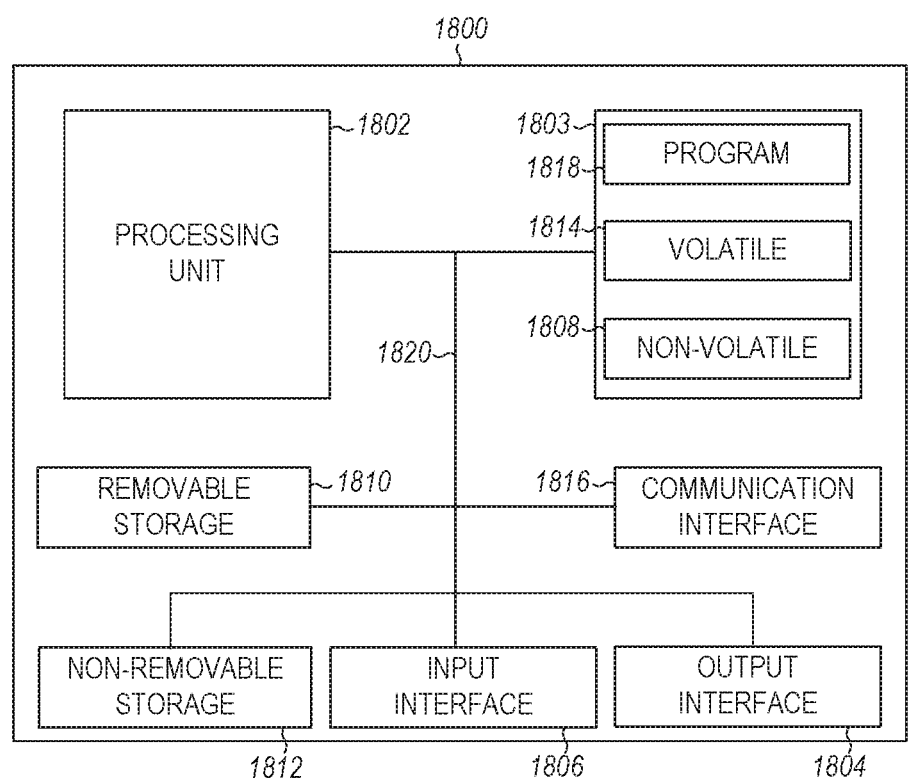
FIG. 18 is a block schematic diagram of a computer system to implement one or more example embodiments.

FIG. 18 is a block schematic diagram of a computer system 1800 to implement and manage one or more of the components used to conduct queries, conversation, analyze grammar, provide suggestions for better queries, and perform other methods and algorithms corresponding to the example embodiments. All components need not be used in various embodiments.

One example computing device in the form of a computer 1800 may include a processing unit 1802, memory 1803, removable storage 1810, and non-removable storage 1812. Although the example computing device is illustrated and described as computer 1800, the computing device may be in different forms in different embodiments. For example, the computing device may instead be a smartphone, a tablet, smartwatch, smart storage device (SSD), or other computing device including the same or similar elements as illustrated and described with regard to FIG. 18. Devices, such as smartphones, tablets, and smartwatches, are generally collectively referred to as mobile devices or user equipment.

Although the various data storage elements are illustrated as part of the computer 1800, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 1803 may include volatile memory 1814 and non-volatile memory 1808. Computer 1800 may include— or have access to a computing environment that includes—a variety of computer-readable media, such as volatile memory 1814 and non-volatile memory 1808, removable storage 1810 and non-removable storage 1812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1800 may include or have access to a computing environment that includes input interface 1806, output interface 1804, and a communication interface 1816. Output interface 1804 may include a display device, such as a touchscreen, that also may serve as an input device. The input interface 1806 may include one or more of a touchscreen, touchpad, mouse, keyboard, camera, one or more device-specific buttons, one or more sensors integrated within or coupled via wired or wireless data connections to the computer 1800, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1800 are connected with a system bus 1820.

Computer-readable instructions stored on a computer-readable medium are executable by the processing unit 1802 of the computer 1800, such as a program 1818. The program 1818 in some embodiments comprises software to implement one or more . . . . A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1818 along with the workspace manager 1822 may be used to cause processing unit 1802 to perform one or more methods or algorithms described herein.

Several examples are now described. Each of the examples may include one or more aspects of the other examples.

Conversation mix examples:

1. A computer implemented method comprising:
providing a series of queries to a user via a client query device;
sending queries from the series of queries via the client query device to an information source client;
receiving information from an information source via the information source client;
determining a proportion of queries to information; and
generating a query communication as a function of the proportion of queries to information.

2. The computer implemented method of example 1 and further comprising sending a new query from the client query device to the information source client responsive to the query communication.

3. The computer implemented method of example 1 and further comprising transcribing the queries and information into query text and information text; and wherein the proportion of queries to information is based on a count of the query text and information text.

4. The computer implemented method of example 3 wherein the count is based on the number of letters in the query text and information text.

5. The computer implemented method of example 3 wherein the count is based on the number of words in the query text and information text.

6. The computer implemented method of example 1 wherein the proportion of queries to information is based on a first aggregation of time for a user to read the queries and a second aggregation of time for the information source comprising an interviewed user of the information source client to provide the information.

7. The computer implemented method of example 1 and further comprising generating a new query responsive to the proportion of queries to information exceeding a threshold.

8. The computer implemented method of example 7 wherein the threshold is selected as a function of a type of the series of queries.

9. The computer implemented method of example 8 wherein the threshold is higher for a first type of series of queries directed toward eliciting fact-based information and lower for a second type of series of queries directed toward eliciting opinion-based information.

10. The computer implemented method of example 9 wherein the new query is selected from a group of queries of varying open and closed ended type of queries such that when the proportion is greater than the threshold results in selection of an open ended new query.

11. A communication monitor comprising:
an input device to receive audio query information and audio query response information;
a processor; and
a memory device coupled to the processor and input device, and having a program stored thereon for execution by the processor to perform operations comprising:
determining a proportion of query information to response information; and
generating a new query as a function of the proportion of query information to response information.

12. The communication monitor of example 11 wherein the input device comprises a microphone, display, and speaker.

13. The communication monitor of example 11 wherein the operations further comprise sending the new query to an information source client device.

14. The communication monitor of example 11 wherein the proportion of queries to information is based on a count of the query text and information text.

15. The communication monitor of example 14 wherein the count is based on the number of letters in the query text and information text or on the number of words in the query text and information text, or on a first aggregation of time for a user to read the queries and a second aggregation of time for the information source comprising an interviewed user of the information source client to provide the information.

16. The communication monitor of example 11 wherein the new query is generated responsive to the proportion of queries to information exceeding a threshold that is selected as a function of a type of the series of queries.

17. The communication monitor of example 16 wherein the threshold is higher for a first type of series of queries directed toward eliciting fact-based information and lower for a second type of series of queries directed toward eliciting opinion-based information.

18. A machine-readable storage device having instructions for execution by a processor of a machine to cause the processor to perform operations to perform a method of managing communication accounts, the operations comprising:
providing a series of queries to a user via a client query device;
sending queries from the series of queries via the client query device to an information source client;

receiving information from an information source via the information source client;

transcribing the queries and information into query text and information text;

determining a proportion of queries to information from the transcribed queries; and generating a new query as a function of the proportion of queries to information.

19. The machine-readable storage device of example 18, wherein the operations further comprise sending the new query from the client query device to the information source client and wherein the proportion of queries to information is based on the number of letters in the query text and information text, based on the number of words in the query text and information text, or based on a first aggregation of time for a user to read the queries and a second aggregation of time for the information source comprising an interviewed user of the information source client to provide the information.

20. The computer implemented method of example 1 wherein the new query is generated responsive to the proportion of queries to information exceeding a threshold that is selected as a function of a type of the series of queries, wherein the threshold is higher for a first type of series of queries directed toward eliciting fact-based information and lower for a second type of series of queries directed toward eliciting opinion based information.

Training of an empathy model examples:

1. A computer method of training an empathy model for detecting a type of query, the method comprising:

defining an intent for detecting closed ended queries;

providing a plurality of queries that are closed ended queries to a machine learning model generator, said plurality of queries comprising training data;

providing a plurality of corresponding labels identifying the plurality of queries as closed ended queries; and generating a model that classifies closed ended queries as a function of the training data.

2. The method of example 1 wherein the machine learning model generator comprises a language understanding machine learning service.

3. The method of example 1 wherein the machine learning model generator provides a confidence level with a classification of each query.

4. The method of example 3 wherein queries beginning with auxiliary verbs including "do", "can", and "would" result in higher confidence levels.

5. The method of example 1 and further comprising:
providing test queries to the generated model;
receiving a classification from the generated model; and
correcting incorrect classifications to further train the model.

6. The method of example 1 and further comprising training the model with a domain specific grammar tailored to a specific domain.

7. The method of example 6 wherein the domain comprises product development and includes development stages of customer, problem, concept, and feature.

8. The method of example 1 and further comprising:
defining an intent for detecting leading queries;
providing a plurality of queries that are leading queries to the machine learning model generator; and
modifying the model to classify leading queries.

9. The method of example 8 wherein the machine learning model generator provides a confidence level with a classification of each query wherein queries beginning with adjectives and adverbs result in higher confidence levels that the query is leading.

10. The method of example 8 and further comprising providing a phrase list to seed the machine learning model generator with emotion intent related terms associated with leading queries, resulting in increasing the confidence levels for queries having such emotion related terms.

11. The method of example 10 wherein the phrase list terms from one or more intents of jobs to be done, closed queries, and problem indicator terms.

12. A machine-readable storage device having instructions for execution by a processor of a machine to cause the processor to perform operations to perform a method of training an empathy model for detecting a type of query, the operations comprising:

defining an intent for detecting closed ended queries;

providing a plurality of queries that are closed ended queries to a machine learning model generator, said plurality of queries comprising training data;

providing a plurality of corresponding labels identifying the plurality of queries as closed ended queries; and generating a model that classifies closed ended queries as a function of the training data.

13. The machine-readable storage device of example 12 wherein the machine learning model generator comprises a language understanding machine learning service that provides a confidence level with a classification of each query.

14. The machine-readable storage device of example 13 wherein queries beginning with auxiliary verbs including "do", "can", and "would" result in higher confidence levels.

15. The machine-readable storage device of example 1 wherein the operations further comprise:
providing test queries to the generated model;
receiving a classification from the generated model; and
correcting incorrect classifications to further train the model.

16. The method of example 1 and further comprising training the model with a domain specific grammar tailored to a specific domain, wherein the domain comprises product development and includes development stages of customer, problem, concept, and feature.

17. The machine-readable storage device of example 12 wherein the operations further comprise:
defining an intent for detecting leading queries;
providing a plurality of queries that are leading queries to the machine learning model generator; and
modifying the model to classify leading queries.

18. The machine-readable storage device of example 17 wherein the machine learning model generator provides a confidence level with a classification of each query wherein queries beginning with adjectives and adverbs result in higher confidence levels that the query is leading, and wherein the operations further comprise providing a phrase list to seed the machine learning model generator with emotion intent related terms associated with leading queries, resulting in increasing the confidence levels for queries having such emotion related terms.

19. A device comprising:
a processor; and
a memory device coupled to the processor and having a program stored thereon for execution by the processor to perform operations comprising:
defining an intent for detecting closed ended queries;
providing a plurality of queries that are closed ended queries to a machine learning model generator, said plurality of queries comprising training data;

providing a plurality of corresponding labels identifying the plurality of queries as closed ended queries; and generating a model that classifies closed ended queries as a function of the training data.

20. The device of example 19 wherein the machine learning model generator comprises a language understanding machine learning service that provides a confidence level with a classification of each query, the operations further comprising training the model with a domain specific grammar tailored to a specific domain.

Use of Model to Generate Conversation Suggestions in Real-Time Examples.

1. A computer implemented method of generating query suggestions, the method comprising:

receiving queries as the queries are posed;

receiving indicia representative of a received query being closed ended; and generating a new query that is more open-ended than the query associated with the received indicia.

2. The method of example 1 wherein the new query is selected from a set of queries in a table.

3. The method of example 2 wherein the new query is generated to elicit more information than information received responsive to the query associated with the received indicia.

4. The method of example 3 wherein the new query is generated as a function of received responses to the query associated with the received indicia, wherein the new query is provided to a user as a next query in the received queries.

5. The method of example 1 wherein the indicia is received from a language understanding machine learning model trained with a plurality of queries that are labeled closed ended queries, and wherein the indicia includes a confidence level value.

6. The method of example 1 wherein generating a new query is performed by a machine learning trained model trained by . . . .

7. A computer implemented method of generating query suggestions, the method comprising:

receiving queries as the queries are posed;

receiving indicia representative of an intent of a received query; and generating a new communication in response to the indicia representative of the intent of the received query.

8. The method of example 6 wherein the new communication is selected from a set of communications in a table.

9. The method of example 8 wherein the new communication is generated to elicit more information than information received responsive to the query associated with the received indicia.

10. The method of example 9 wherein the new communication is generated as a function of received responses to the query associated with the received indicia, wherein the new communication is provided to a user as a next query in the received queries.

12. The method of example 7 wherein the indicia is received from a language understanding machine learning model trained with a vivid grammar and a domain specific grammar.

13. The method of example 11 wherein the indicia includes a confidence level value.

14. The method of example 7 wherein the indicia includes data representative of at least one of a communication confirmation, a job to be done, a leading question, a problem, and a yes/no question.

15. The method of example 13 wherein the data corresponding to a job to be done or a problem includes at least one indication of how, how much, where, who/what, and why.

Burndown List to Ensure Complete Data Collection Examples

1. A computer implemented method of enhancing query sessions, the method comprising:

obtaining a list of topics to be covered in a query session;

receiving a series of queries during the query session;

receiving query coverage data indicative of at least one topic in the query session; and generating a communication directed toward coverage of at least one incompletely covered topic in response to the query coverage data.

2. The method of example 1 and further comprising:

keeping track of a time remaining in the query session; and wherein the communication is generated as a function of the time remaining in the query session.

3. The method of example 1 wherein the query coverage data is indicative of a number of topics covered in the list of topics.

4. The method of example 3 wherein the communication identifies topics not yet covered in the list of topics.

5. The method of example 4 wherein the communication identifying topics not yet covered comprises a list of topics with indications of coverage associated with each topic in the list.

6. The method of example 1 wherein the indications of coverage comprise query suggestions received during the query session that were not asked, wherein the query suggestions are correlated with the list of topics.

7. The method of example 1 wherein the query coverage data is received from a trained query and information measurement model that is trained with vivid grammar labeled utterances to match language syntax between the list of topics and the received queries.

8. The method of example 7 wherein the model is further trained on a domain specific grammar labeled utterances.

Use of a Model to Modify Conversation Scripts Prior to Conversation

1. A computer implemented method comprising:

retrieving a script containing a series of queries at a computing device:

receiving indicia representative of the received queries being closed ended;

generating new queries that are more open-ended in response to the received indicia; and replacing the closed ended questions in the script with the generated new queries.

2. The computer implemented method of example 1 and further comprising:

replacing at least one query in the series of queries with a generated new query.

3. The method of example 1 wherein the new query is selected from a set of queries in a table.

4. The method of example 3 wherein the new query is generated to elicit more information than information received responsive to the query associated with the received indicia.

5. The method of example 4 wherein the new query is generated as a function of received responses to the query associated with the received indicia, wherein the new query is provided to a user as a next query in the received queries.

6. The method of example 1 wherein the indicia is received from a language understanding machine learning model trained with a plurality of queries that are labeled closed ended queries, and wherein the indicia includes a confidence level value.

7. A computer implemented method comprising:

retrieving a script containing a series of queries at a computing device:

receiving indicia representative of an intent of one of the queries in the script;

generating a new communication in response to the received indicia representative of the intent of the query; and replacing the query in the script with the generated new communication.

8. The method of example 7 wherein the new communication is selected from a set of communications in a table.

9. The method of example 8 wherein the new communication is generated to elicit more information than information received responsive to the query associated with the received indicia.

10. The method of example 9 wherein the new communication is generated as a function of received responses to the query associated with the received indicia, wherein the new communication is provided to a user as a next query in the received queries.

11. The method of example 7 wherein the indicia is received from a language understanding machine learning model trained with a vivid grammar and a domain specific grammar.

12. The method of example 12 wherein the indicia includes a confidence level value.

13. The method of example 7 wherein the indicia includes data representative of at least one of a communication confirmation, a job to be done, a leading question, a problem, and a yes/no question.

14. The method of example 13 wherein the data corresponding to a job to be done or a problem includes at least one indication of how, how much, where, who/what, and why.

Establishing Common Ground Via Use of Auxiliary Data (e.g., Linkedin) Examples.

In various examples, data is obtained from one or more social media platform(s) that includes details corresponding to the person (such as Facebook, LinkedIn, organization structure, Stakeholder relationships, Twitter, etc.).

The model is trained to use the data from the social network graph-type service to generate rapport, by giving examples of the types of information that are good topics, without being too intrusive. For example, by taking the data on the interviewee and comparing it to the data on the interviewer to look for commonalities (e.g., you both went to the same school, know a person in common, worked for the same company, develop in Java, grew up in the same hometown). If no commonalities exist, then the model picks a most relevant topic (e.g., products or programming languages used).

1. A method of generating query suggestions for a user, the method comprising:

receiving information regarding a person to be queried by the user, the information being received from a service that queries multiple social media services regarding the person;

comparing the received information to information corresponding to the user;

identifying one or more details in common based on the comparison of the information; and generating a query suggestion that incorporates at least one identified detail in common based on the comparison of information.

2. The method of example 1 wherein the service that provides the received information regarding the person comprises a social network graph service.

3. The method of example 1 wherein the one or more details in common include knowing a same person, attending a same school, growing up in a same location, worked for a same company, and used a same programming language.

4. The method of example 3 wherein the details in common are prioritized, with the lowest priority associated with using a same programming language.

5. The method of example 1 wherein the query suggestion is selected from a table of query suggestions.

6. The method of example 1 the query suggestion is generated by a machine learning model trained with labeled examples of queries associated with details in common, selected from the group consisting of knowing a same person, attending a same school, growing up in a same location, worked for a same company, and used a same programming language.

Clarifying Privacy Examples.

In one embodiment, a rule set can be defined that detects questions that violate organizational or regulatory policy, and corrected advice can be delivered to the interviewer. The model 562 may be trained with a domain grammar that corresponds to violations of such rules. Medical related questions in a non-medical setting or a conversation shared with more than one party may violate such policies as well as the health insurance portability and accountability act of 1996 and other privacy related regulations, rules, laws, and policies.

1. A method of generating communication suggestions, the method comprising:

receiving queries as the queries are posed to a person;

receiving indicia representative of the at least one of the received queries being likely to elicit private information in violation of a privacy policy;

generating a communication suggestion that is less likely to elicit private information from a person than a most recent posed query in response to the received indicia.

2. The method of example 1 wherein the new communication is selected from a set of communications in a table.

3. The method of example 1 wherein the indicia is received from a language understanding machine learning model trained with a vivid grammar and a domain specific grammar.

4. The method of example 5 wherein the indicia includes a confidence level value.

5. The method of example 4 wherein the domain specific grammar comprises language syntax likely used for queries that ask for private information in violation of the privacy policy.

6. The method of example 5 wherein the privacy policy includes organizational and regulatory privacy policies.

Detecting and Reporting on Various Forms of Bias Examples.

1. A method of generating query suggestions, the method comprising:

receiving queries as the queries are posed;

receiving indicia representative of the received queries including a form of bias;

generating a new query that does not include the form of bias than a most recent posed query in response to the received indicia.

2. A method of generating communication suggestions, the method comprising:

receiving queries as the queries are posed by a user to a person;

receiving indicia representative of the at least one of the received queries being influenced by user bias;

generating a communication suggestion that is less likely to exhibit user bias, the communication suggestion being generated as a function of the at least one of the received queries and the indica.

3. The method of example 2 wherein the new communication is selected from a set of communications in a table.

4. The method of example 2 wherein the indicia is received from a language understanding machine learning model trained with a vivid grammar and a domain specific grammar.

5. The method of example 4 wherein the indicia includes a confidence level value.

6. The method of example 5 wherein the domain specific grammar comprises language syntax commonly used for queries that exhibit bias.

7. The method of example 6 wherein the bias comprises one or more of curse of knowledge, empathy gap, focusing effect, wishful thinking, expectation bias, and confirmation bias.

8. The method of example 2 wherein the communication suggestion is generated to focus the query session on recalled events rather than biased generalizations.

Enhancing Emotion Detection Through Other Signals (e.g., Voice Inflection Analysis, Eye Movement Analysis, Body Language Analysis, Micro-Expressions, Bio-Feedback/Blood Pressure/Heart Rate, Bio-Feedback, Etc.) Examples.

In various embodiments, a method generates query suggestions by receiving queries at computing resources as the queries are posed to a person by a user, receiving information at the computing resources from the person (such as using voice (e.g., for voice inflection), video (e.g., for micro-expressions and body language), or from sensors (e.g. EKG readings)), using commercially-available services (such as the Face API Azure Cognitive Service's Emotion recognition) to derive, via the computing resources, a representation of an emotion of the person from the received information. Services, such as Sentiment analysis, may be used on the transcription to detect the positive, negative, or neutral sentiment of the utterances. The conversation bot is then trained to notice inconsistencies between the emotions coming from two or more of these sources for consistency and, depending on the inconsistency, to follow up with additional queries, to better understand the apparent dissonance and underlying user emotions, opinions, and behaviors. Computing resources are used to generate a new query as a function of the representation(s) of emotion of the person (be it consistent or dissonant.) The new query may then be posed to the person.

1. A method of generating query suggestions, the method comprising:

receiving queries at computing resources as the queries are posed to a person by a user;

receiving information at the computing resources from the person;

obtaining via the computing resources, a representation of an emotion of the person from the received information;

generating, via the computing resources, a new query as a function of the representation(s) of emotion of the person; and posing the new query to the person.

2. The method of example 1 wherein the received information comprises data representative of a pupil dilation analysis.

3. The method of example 1 wherein the received information comprises data representative of a video analysis.

4. The method of example 3 wherein the video analysis is based on at least one of micro expressions and body language.

5. The method of example 1 wherein the received information comprises data representative of an analysis of voice inflection.

6. The method of example 1 wherein receiving information from the person comprises receiving at least one of video and audio of the person, and wherein deriving, via the computing resources, a representation of an emotion of the person from the received information comprises sending one or more of the received video and audio to one or more of a video analysis service and an audio analysis service.

7. The method of example 1 and further comprising:

detecting sentiment from transcribed utterances of the person;

determining inconsistencies between the sentiment and the emotion of the person; and wherein generating the new query is a function of the inconsistencies.

8. The method of example 7 wherein the new query is generated to obtain information from the person representative of the inconsistencies.

Creating an Interview Bot Examples.

1. A method comprising:

receiving a series of queries by a communication generator for executing on computing resources;

connecting to a person to be queried via a communication connection;

receiving indicia representative of the received series of queries being open ended or closed ended;

generating at least one new query that is more open-ended than a most recent posed query in response to the received indicia; and communicating the at least one new query to the person via the communication connection.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer method of training an empathy model for detecting a type of query, the method comprising:

defining an intent for detecting closed ended queries;

providing a plurality of queries that are closed ended queries to a machine learning model generator, said plurality of queries comprising training data;

providing a plurality of corresponding labels identifying the plurality of queries as closed ended queries;

seeding a model with a phrase list comprising terms; and generating a model that classifies closed ended queries as a function of the training data and phrase lists by increasing a weight of terms in the phrase list.

2. The method of claim 1 wherein the machine learning model generator comprises a language understanding machine learning service and wherein the phrase list comprises terms representative of problems selected as a function of a domain specific grammar.

3. The method of claim 1 wherein the machine learning model generator provides a confidence level with a classification of each query.

4. The method of claim 3 wherein queries beginning with auxiliary verbs comprising the phrase list terms including "do", "can", and "would" result in higher confidence levels.

5. The method of claim 1 and further comprising:
providing test queries to the generated model;
receiving a classification from the generated model; and
correcting incorrect classifications to further train the model.

6. The method of claim 1 wherein the phrase list comprises entities comprise terms representative of emotions.

7. The method of claim 1 wherein the phrase list terms tailored to a specific domain the domain comprises product development and includes development stages of customer, problem, concept, and feature.

8. The method of claim 1 and further comprising:
defining an intent for detecting leading queries;
providing a plurality of queries that are leading queries to the machine learning model generator; and
modifying the model to classify leading queries.

9. The method of claim 8 wherein the phrase list comprises terms with emotion intent associated with leading queries, resulting in increasing the confidence levels for queries having such emotion related terms.

10. The method of claim 9 wherein the phrase list includes terms from one or more intents of jobs to be done, closed queries, and problem indicator terms.

11. The method of claim 1 wherein the machine learning model generator provides a confidence level with a classification of each query wherein queries beginning with phrase list terms comprising adjectives and adverbs result in higher confidence levels that the query is leading.

12. A machine-readable storage device having instructions for execution by a processor of a machine to cause the processor to perform operations to perform a method of training an empathy model for detecting a type of query, the operations comprising:
defining an intent for detecting closed ended queries;
providing a plurality of queries that are closed ended queries to a machine learning model generator, said plurality of queries comprising training data;
providing a plurality of corresponding labels identifying the plurality of queries as closed ended queries;
seeding a model with a phrase list comprising terms; and
generating a model that classifies closed ended queries as a function of the training data and phrase lists by increasing a weight of terms in the phrase list.

13. The machine-readable storage device of claim 12 wherein the machine learning model generator comprises a language understanding machine learning service that provides a confidence level with a classification of each query and wherein the phrase list comprises terms representative of problems selected as a function of a domain specific grammar.

14. The machine-readable storage device of claim 13 wherein queries beginning with auxiliary verbs comprising the phrase list terms including "do", "can", and "would" result in higher confidence levels.

15. The machine-readable storage device of claim 12 wherein the operations further comprise: providing test queries to the generated model; receiving a classification from the generated model; and correcting incorrect classifications to further train the model.

16. The machine-readable storage device of claim 12 and further comprising training the model with a domain specific grammar tailored to a specific domain, wherein the domain comprises product development and includes development stages of customer, problem, concept, and feature.

17. The machine-readable storage device of claim 12 wherein the operations further comprise: defining an intent for detecting leading queries; providing a plurality of queries that are leading queries to the machine learning model generator; and modifying the model to classify leading queries.

18. The machine-readable storage device of claim 17 wherein the machine learning model generator provides a confidence level with a classification of each query wherein queries beginning with phrase list terms comprising adjectives and adverbs result in higher confidence levels that the query is leading, and wherein the phrase list comprises terms with emotion intent associated with leading queries, resulting in increasing the confidence levels for queries having such emotion related terms.

19. A device comprising:
a processor; and
a memory device coupled to the processor and having a program stored thereon for execution by the processor to perform operations comprising:
defining an intent for detecting closed ended queries;
providing a plurality of queries that are closed ended queries to a machine learning model generator, said plurality of queries comprising training data;
providing a plurality of corresponding labels identifying the plurality of queries as closed ended queries;
seeding a model with phrase list comprising terms; and
generating a model that classifies closed ended queries as a function of the training data and phrase lists by increasing a weight of terms in the phrase list.

20. The device of claim 19 wherein the machine learning model generator comprises a language understanding machine learning service that provides a confidence level with a classification of each query, and wherein the phrase list comprise words representative of emotions.

* * * * *